(12) United States Patent
Koguchi et al.

(10) Patent No.: US 10,626,805 B2
(45) Date of Patent: Apr. 21, 2020

(54) AUTOMOTIVE POWERTRAIN UNIT

(71) Applicant: MAZDA MOTOR CORPORATION, Hiroshima (JP)

(72) Inventors: Tomohiro Koguchi, Higashihiroshima (JP); Shinji Fujihira, Hiroshima (JP); Ryotaro Nishida, Hiroshima (JP); Takeshi Nakahira, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 15 days.

(21) Appl. No.: 16/103,559

(22) Filed: Aug. 14, 2018

(65) Prior Publication Data

US 2019/0063340 A1 Feb. 28, 2019

(30) Foreign Application Priority Data

Aug. 24, 2017 (JP) .................................. 2017-161495

(51) Int. Cl.
*F02D 21/08* (2006.01)
*F02M 26/41* (2016.01)
(Continued)

(52) U.S. Cl.
CPC ................ *F02D 21/08* (2013.01); *B60K 5/04* (2013.01); *B60K 5/10* (2013.01); *B60K 13/04* (2013.01);
(Continued)

(58) Field of Classification Search
CPC . B60K 5/04; B60K 5/10; F01N 13/105; F01P 2003/028; F02B 3/08;
(Continued)

(56) References Cited

U.S. PATENT DOCUMENTS 6,263,267 B1 * 7/2001 Anthony ................. B60L 50/61
701/22
6,492,741 B1 * 12/2002 Morimoto ............... B60L 50/15
290/40 C
(Continued)

FOREIGN PATENT DOCUMENTS

DE   112015000072 T5   2/2016
DE   112015001648 T5   1/2017
(Continued)

OTHER PUBLICATIONS

BMW, "Product Information. N47 engine.", Nov. 30, 2006 (Nov. 30, 2006), 193 pages, XP055631279, München, Germany, retrieved from the Internet: URL:http://dropspec.co.za/N47_Detailed.pdf [retrieved on Oct. 11, 2019].

*Primary Examiner* — Jesse S Bogue

(74) *Attorney, Agent, or Firm* — Studebaker & Brackett PC

(57) ABSTRACT

The present disclosure improves serviceability of an automotive powertrain unit without deteriorating NVH characteristics. A powertrain includes an engine having a cylinder head; and a transmission coupled to the engine. The engine includes an EGR connected between an intake passage and an exhaust passage. The transmission is provided below the cylinder head in a vehicle height direction. The EGR is provided along a side of the cylinder head toward the transmission, and supported by the transmission.

6 Claims, 15 Drawing Sheets

(51) Int. Cl.
*F02M 26/32* (2016.01)
*F02M 26/28* (2016.01)
*B60K 5/10* (2006.01)
*B60K 5/04* (2006.01)
*B60K 13/04* (2006.01)
*F02M 26/23* (2016.01)
*F01N 13/10* (2010.01)
*F02D 41/00* (2006.01)
*F01P 3/02* (2006.01)
*F02F 1/36* (2006.01)
*F02F 7/00* (2006.01)
*F02M 26/09* (2016.01)
*F02B 3/08* (2006.01)

(52) U.S. Cl.
CPC ....... *F01N 13/105* (2013.01); *F02D 41/0007* (2013.01); *F02D 41/0057* (2013.01); *F02M 26/23* (2016.02); *F02M 26/28* (2016.02); *F02M 26/32* (2016.02); *F02M 26/41* (2016.02); *F01P 2003/028* (2013.01); *F02B 3/08* (2013.01); *F02D 2041/001* (2013.01); *F02F 1/36* (2013.01); *F02F 2007/0078* (2013.01); *F02M 26/09* (2016.02)

(58) Field of Classification Search
CPC ............... F02D 2041/001; F02D 21/08; F02D 41/0007; F02D 41/0057; F02F 1/36; F02F 2007/0078; F02M 26/09; F02M 26/23; F02M 26/28; F02M 26/32; F02M 26/41
See application file for complete search history.

(56) References Cited

U.S. PATENT DOCUMENTS 9,388,765 B2 * 7/2016 Kurita ..................... F02F 11/00
2017/0370272 A1 * 12/2017 Koguchi ................... F01P 3/02

FOREIGN PATENT DOCUMENTS

| | | |
|---|---|---|
| EP | 2589772 A1 | 5/2013 |
| JP | 2006-070878 A | 3/2006 |
| JP | 2008-180173 A | 8/2008 |
| JP | 4835445 B2 | 12/2011 |
| JP | 2013-024408 A | 2/2013 |
| JP | 2014-141891 A | 8/2014 |
| JP | 2015-077823 A | 4/2015 |
| JP | 2015-200203 A | 11/2015 |
| JP | 2016-065465 A | 4/2016 |
| WO | 2012/160968 A1 | 11/2012 |

* cited by examiner

AUTOMOTIVE POWERTRAIN UNIT

CROSS-REFERENCE TO RELATED APPLICATION

This application claims priority to Japanese Patent Application No. 2017-161495 filed on Aug. 24, 2017, the entire disclosure of which is hereby incorporated by reference.

BACKGROUND

The present disclosure relates to an automotive powertrain unit.

Japanese Unexamined Patent Publication No. 2016-65465 discloses an example of an engine included in an automotive powertrain unit. Specifically, Japanese Unexamined Patent Publication No. 2016-65465 discloses an engine including an external exhaust gas recirculator (EGR) connected to an intake passage and an exhaust passage. As illustrated in FIG. 1 of the publication, the EGR is provided to an end of the engine along the engine output shaft.

When the automotive powertrain unit is overhauled (in particular, a valve system of the engine is overhauled), the cylinder head may be removed from the engine. Even though the engine is mounted in the vehicle, such overhaul service needs to be carried out smoothly.

Meanwhile, the EGR disclosed in the Japanese Unexamined Patent Publication No. 2016-65465 is usually supported by the cylinder head. However, when the cylinder head is to be removed for the overhaul service, such a configuration requires the EGR to be removed in advance from the cylinder head.

The EGR includes multiple devices such as an EGR passage connecting an exhaust passage and an intake passage of the engine, and an EGR cooler for cooling burned gas. Hence, removing the EGR from the cylinder head takes time, and thus is inconvenient for smooth overhaul of the engine. In such a case, a space is required to store the removed EGR. In view of this extra space required, the EGR has room for improvement for smooth overhaul service.

The EGR could be supported by the vehicle body. However, considering that the EGR is connected to both the intake passage and the exhaust passage, such a support structure could transmit a vibration caused by an operation of the engine to the automotive body through the EGR when the vibration enters the EGR through the intake passage and the exhaust passage. The transmission of the vibration deteriorates noise vibration and harshness (NVH) characteristics of the vehicle, and is not preferable.

The present disclosure is conceived in view of the above problems, and intends to improve serviceability of an automotive powertrain unit without deteriorating NVH characteristics.

SUMMARY

The technique disclosed herein is directed to an automotive powertrain unit. This automotive power train unit includes: an engine having a cylinder block and a cylinder head coupled to the cylinder block; and a transmission coupled to an end of the engine along an engine output shaft, and mounted on a side of the cylinder block, wherein the engine includes: an intake passage connected to one side of the engine and an exhaust passage connected to an other side of the engine different from the one side; and an external exhaust gas recirculator (EGR) connecting the intake passage and the exhaust passage together in fluid communication.

The EGR is provided along the end of the engine along the engine output shaft, a timing system cover is provided along the engine output shaft between (i) the EGR and (ii) the cylinder block and the cylinder head, the timing system cover being mounted on the cylinder head, and the EGR is supported by the transmission.

In the above configuration, the EGR is provided along a side of the engine. When provided in such a manner, the EGR has usually been supported by the cylinder head. However, as described above, the EGR supported by the cylinder head makes smooth overhaul service difficult.

Whereas, in the configuration of the present disclosure, the EGR is supported not by the cylinder head but by the transmission. Hence, when the cylinder head is to be removed, such a configuration eliminates the need for a process of removing the EGR from the cylinder head. As a result, the configuration successfully reduces the number of processes, improving serviceability of the powertrain unit.

Compared with a configuration of supporting the EGR by the automotive body, supporting the EGR by the transmission makes it possible to reduce the transmission of the vibration through the EGR. This is advantageous in achieving NVH characteristics.

As a result, such a configuration successfully improves serviceability of the powertrain unit without deteriorating the NVH characteristics.

The EGR may include: an EGR passage; and an EGR cooler interposed in the EGR passage, and the EGR cooler may be supported by the transmission.

Compared with other elements such as the EGR passage included in the EGR, the EGR cooler weighs extra for a circulating coolant.

In the above configuration, the EGR cooler weighing extra in the EGR is supported by the transmission. Such a feature can implement a more stable support structure.

The EGR cooler may be a water-cooling cooler configured to circulate a coolant supplied from a water pump in the EGR cooler, the engine further comprising: a cooling circuit that includes: a first circuit configured to pass the coolant discharged from the water pump through a block water jacket formed in the cylinder block, then through a head water jacket formed in the cylinder head, and then sucked into the water pump; and a second circuit branching off from the block water jacket in the first circuit, wherein the EGR cooler is interposed in the second circuit.

In the above configuration, for example, the EGR cooler can be connected to the second circuit directly downstream of the head water jacket. Such a feature makes it possible to reduce a heat flow rate inside the engine for bypassing the head water jacket. As a result, a coolant having a relatively low temperature can be supplied to the EGR cooler. The lower the temperature of the coolant is, the higher the cooling performance of the EGR cooler can be. Hence, the EGR cooler can be downsized.

Downsizing the EGR cooler is advantageous in obtaining a larger workspace in the engine compartment. In other words, near the EGR cooler, such service as removing a timing chain cover can be carried out more smoothly. This is advantageous in improving serviceability of the automotive powertrain unit.

The timing system cover may include: a first cover mounted on the cylinder block, and provided with the transmission; and a second cover mounted on the cylinder head.

In this configuration, the timing system cover is divided into the first cover and the second cover. The first cover is provided with the transmission 2; whereas the second cover covers a side of the cylinder head. Hence, when the cylinder head is to be removed from the engine, the transmission does not have to be dismounted from the cover for removing the whole cover. Instead, all that need is to remove the second cover alone without dismounting the transmission from the cover. This is advantageous in improving serviceability of the automotive powertrain unit.

The engine may include: a camshaft provided at the cylinder head and extending along the engine output shaft; and a power transmission mechanism provided at the end of the engine along the engine output shaft, and configured to transmit power of the engine output shaft to the camshaft, wherein the cover may cover the power transmission mechanism.

Such a configuration is advantageous in improving serviceability of, in particular, a camshaft drive mechanism.

The automotive powertrain unit may further include an accessory drive mechanism provided to a side on an other end of the engine along the engine output shaft, and configured to drive an accessory of the engine.

Compared with a case where the camshaft drive mechanism and the accessory drive mechanism are both provided to a side of the engine toward an end of the engine output shaft; that is a side of the engine toward the transmission, the above configuration is advantageous in improving serviceability of the automotive powertrain unit.

The automotive powertrain unit may further include an additional device, wherein the second cover may be provided with the additional device, and at least a part of the EGR is provided between the additional device and the transmission; wherein the additional device is at least one selected from the group consisting of a variable valve timing system and a fuel pump.

Here, the "additional device" includes devices in general to be added to the engine, such as various kinds of accessories including a variable valve mechanism and a fuel pump.

When the additional device is to be removed from the second cover while, for example, the cylinder head is removed, such a configuration can reduce the risk of interference of the additional device with the EGR. As a result, such a feature facilitates the removal of the cylinder head, and is eventually advantageous in improving serviceability of the automotive powertrain unit.

The EGR may be spaced apart from the second cover along the engine output shaft.

Such a configuration is advantageous in reducing the risk that a vibration caused by an operation of the engine enters the EGR through the cover. This curbs noise to be released from the EGR cooler, and is advantageous in achieving NVH characteristics.

Another technique disclosed herein is directed to an automotive powertrain unit. This automotive powertrain unit includes: an engine having a cylinder block and a cylinder head coupled to the cylinder block; a transmission coupled to an end of the engine along an engine output shaft, and mounted on a side of the cylinder block; and a motor interposed between the engine and the transmission, wherein the engine includes: an intake passage connected to one side of the engine and an exhaust passage connected to an other side of the engine different from the one side; and an external exhaust gas recirculator (EGR) connecting the intake passage and the exhaust passage together in fluid communication.

The EGR is provided along an end of the engine along the engine output shaft, and the EGR is supported by the motor.

Here, the "motor" is an electric motor in general for a hybrid vehicle.

As a result, such a configuration successfully improves serviceability of the automotive powertrain unit without deteriorating the NVH characteristics.

As can be seen, the above automotive powertrain unit can obtain improved serviceability without deteriorating the NVH characteristics.

DETAILED DESCRIPTION

Embodiments of an automotive powertrain unit will be described in detail below, with reference to the drawings. The descriptions below are only an example.

First Embodiment

Figure 1:
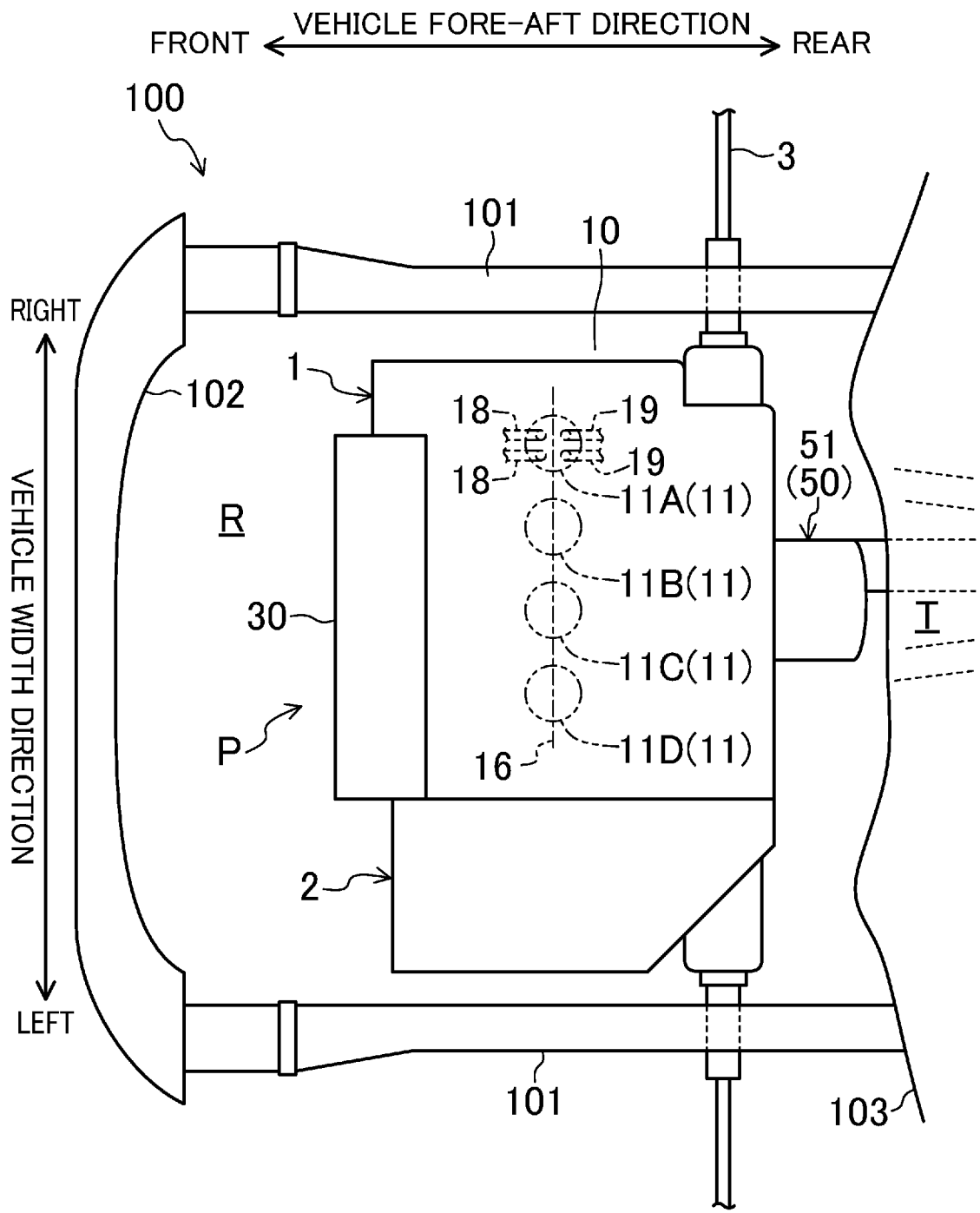
FIG. 1 schematically illustrates a vehicle in which a powertrain unit is mounted.
Figure 2:
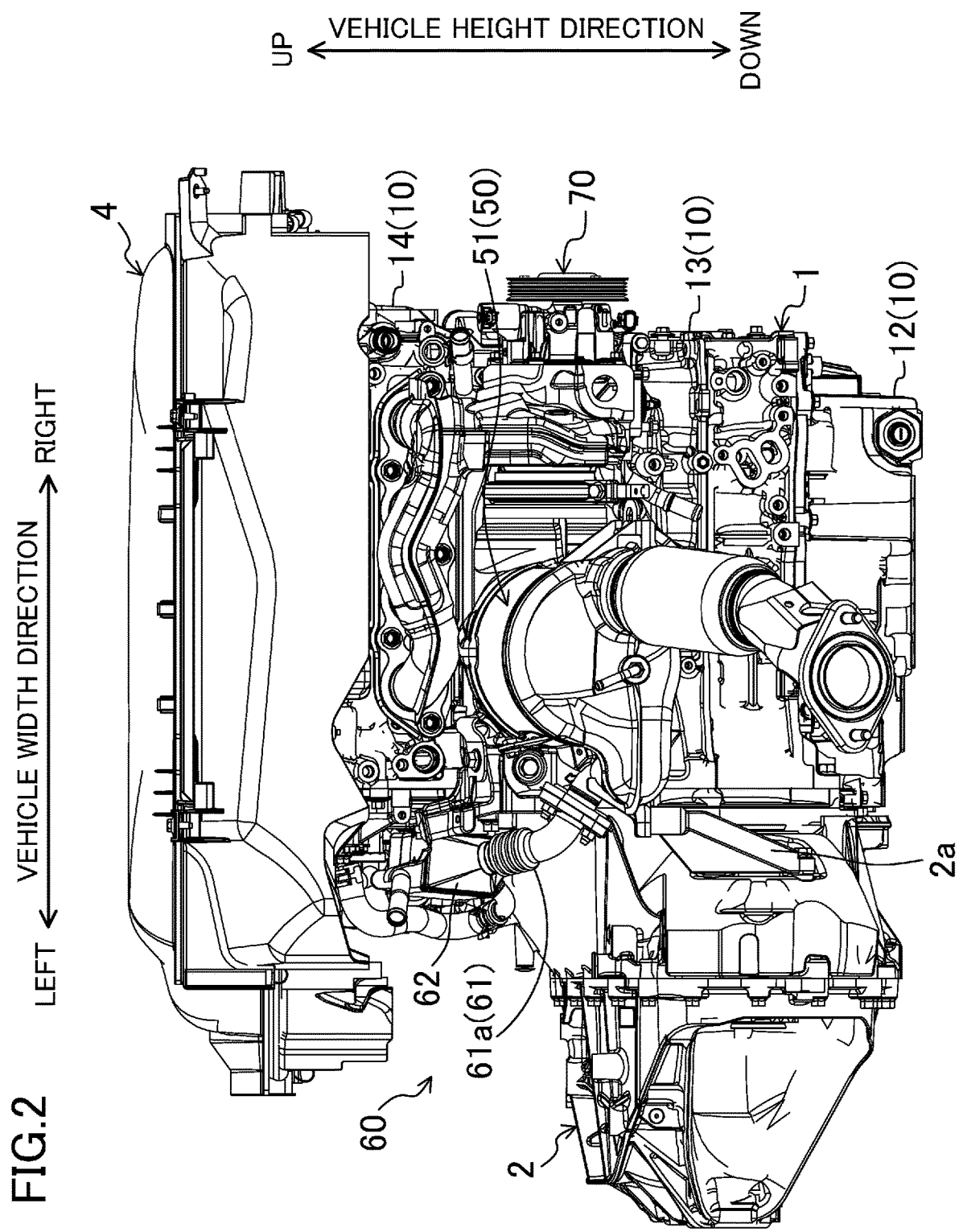
FIG. 2 illustrates the powertrain unit viewed from behind.
Figure 3:
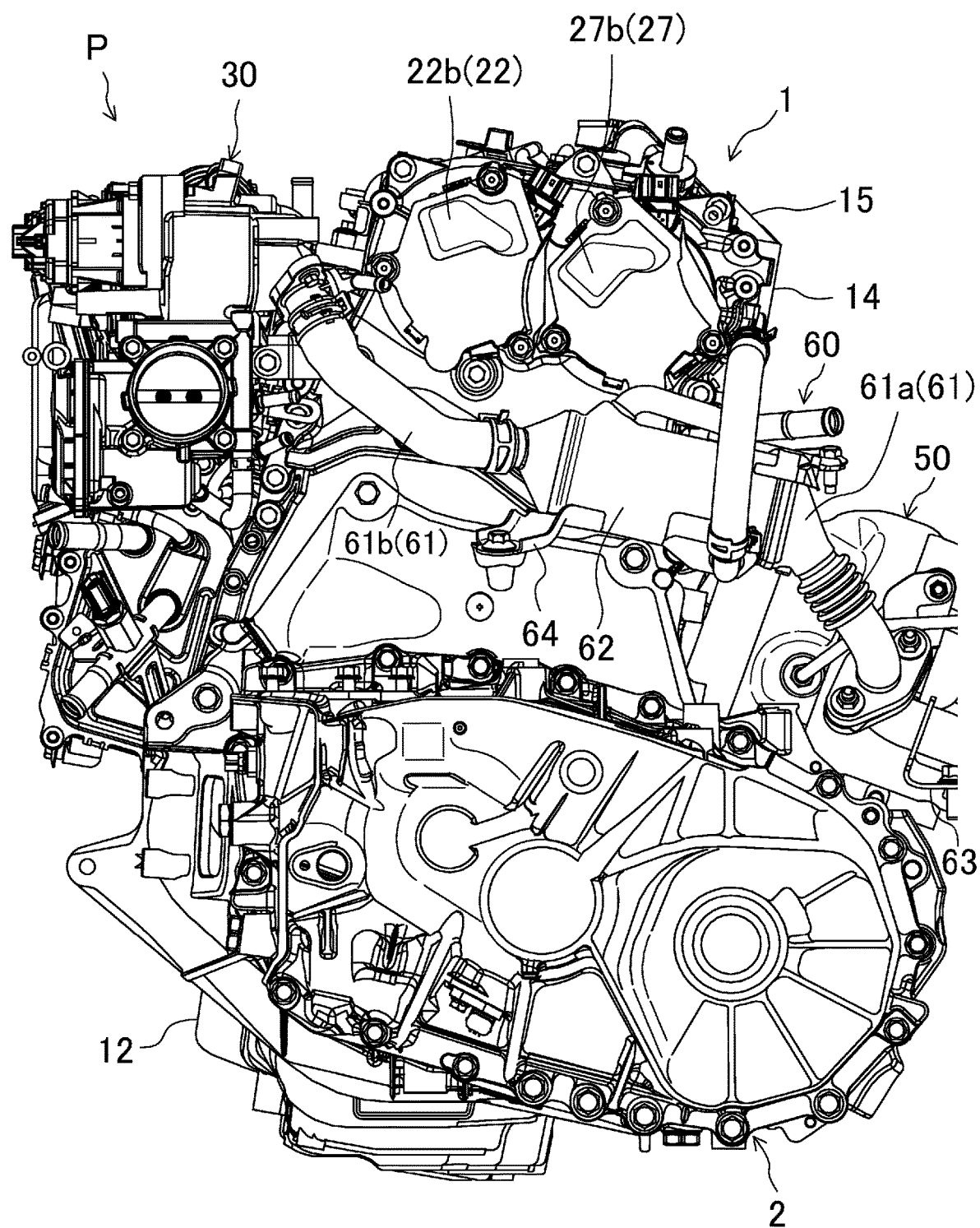
FIG. 3 illustrates the powertrain unit viewed from the left.
Figure 4:
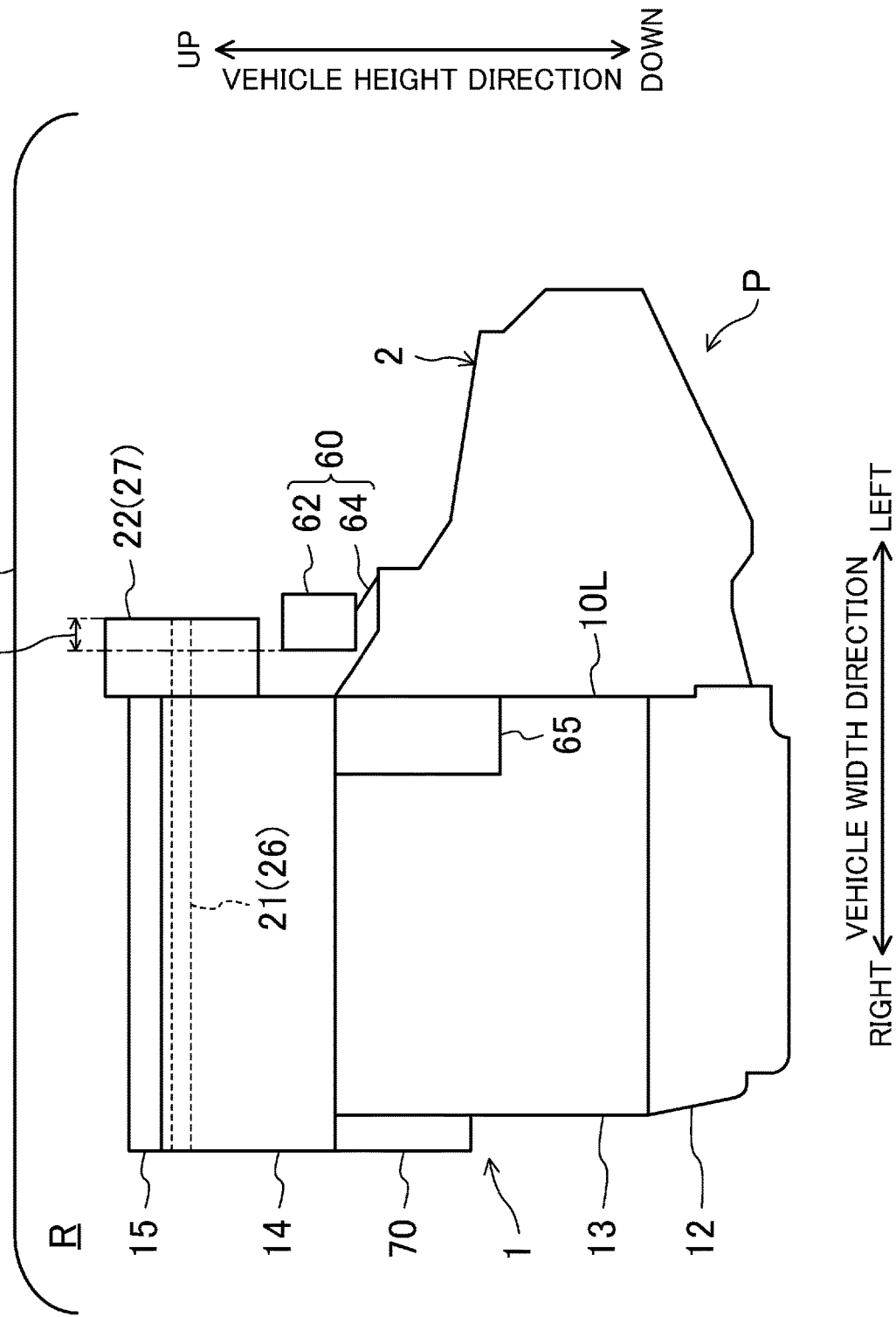
FIG. 4 illustrates a schematic layout of a powertrain unit for a front-engine, front-wheel drive (FF) vehicle.

As a first embodiment, described first is a powertrain unit P mounted in an FF vehicle. FIG. 1 illustrates a front part of a motor vehicle (vehicle) 100 in which a powertrain unit P disclosed herein is mounted. FIG. 2 illustrates the powertrain unit P viewed from behind. FIG. 3 illustrates the powertrain unit P viewed from the left. FIG. 4 schematically illustrates a main layout of the powertrain unit P for the FF vehicle.

(Schematic Configuration of Powertrain Unit)

The powertrain unit P includes an engine 1 and a transmission 2 coupled to the engine 1. The engine 1 is a four-stroke gasoline engine, and capable of both spark ignition combustion and compression ignition combustion.

Meanwhile, the transmission 2 is, for example, a manual transmission. The transmission 2 transmits power of the engine 1 to rotate and drive a drive shaft 3.

The motor vehicle 100 provided with the powertrain unit P is an FF vehicle. Specifically, the powertrain unit P, the drive shaft 3, and driving wheels (i.e., front wheels) coupled to the drive shaft 3 are all arranged in the front of the motor vehicle 100.

The automotive body of the motor vehicle 100 includes multiple frames. In particular, the front part of the automotive body includes: a pair of side frames 101 on the right-hand side and the left-hand side each provided to either side along the vehicle width, and extending in a fore-aft direction of the motor vehicle 100; and a front frame 102 provided between front ends of the pair of side frames 101.

The automotive body has an engine compartment R, and the powertrain unit P is mounted in the engine compartment R. As shown in FIGS. 1 and 4, the engine compartment R includes: a hood 104 provided above the powertrain unit P; and a dash panel 103 provided behind the engine 1 and separating the engine compartment R from a cabin for accommodating an occupant. Note that the hood 104 is an example of a "partition" provided behind the engine 1 and defining a rear face of the engine compartment R. The partition is not limited to the hood 104. Alternatively, the partition may include multiple members such as a cowl (not shown) located above the hood 104, and a floor panel (not shown).

Although not illustrated in the first embodiment, the hood 104 gradually rises from the front to the rear in the vehicle fore-aft direction.

Moreover, as illustrated in FIG. 1, the dash panel 103 is provided with a tunnel T extending in the vehicle fore-aft direction. The tunnel T is provided with a duct for guiding exhaust gas to a muffler, and lets aerodynamic drag flow out of the engine compartment R while the vehicle is running.

The engine 1 is a so-called in-line four-cylinder transverse engine including four cylinders 11 arranged in line along the vehicle width. In this embodiment, the engine fore-aft direction, in which the four cylinders 11 are arranged (along a cylinder bank), is substantially the same as the vehicle width direction, while the engine width direction is substantially the same as the vehicle fore-aft direction.

Note that, in an in-line multi-cylinder engine, the cylinder bank, the central axis of a crankshaft 16 acting as an engine output shaft (an engine output shaft direction), and a central axis for each of an intake camshaft 21 and an exhaust camshaft 26 coupled to the crankshaft 16 run in the same direction. Hereinafter, the direction may be referred to as the cylinder bank direction (or the vehicle width direction).

Hereinafter, unless otherwise noted, the term "front" means either side in the engine width direction (the front in the vehicle fore-aft direction), the term "rear" means the other side in the engine width direction (the rear in the vehicle fore-aft direction), the term "left" means either side in the engine fore-aft direction; namely, the cylinder bank direction (the left in the vehicle width direction to the front of the engine 1 and to the transmission 2 in the powertrain unit P), and the term "right" means the other side in the engine fore-aft direction; namely, the cylinder bank direction (the right in the vehicle width direction to the rear of the engine 1 and to the engine 1 in the powertrain unit P).

In the description below, the term "upper side" means an upper side in the vehicle height direction when the powertrain unit P is mounted in the motor vehicle 100 (hereinafter also referred to as an "in-vehicle mounted state"), the term "lower side" means a lower side in the vehicle height direction when the powertrain unit P is mounted in the motor vehicle 100.

Meanwhile, the transmission 2 is coupled to an end of the engine 1 along the engine output shaft. In the engine 1, the transmission 2 is adjacent to a cylinder block 13, not to a cylinder head 14. Specifically, the transmission 2 is mounted to a left side face of the engine 1, and adjacent to the engine 1 in the cylinder bank direction. Whereas, in the vehicle height direction, the transmission 2 is provided below the cylinder head 14 (specifically, as illustrated in FIG. 4, the intake camshaft 21 and the exhaust camshaft 26 rotatably supported by the cylinder head 14) of the engine 1.

Moreover, an engine cover 4 is provided above the engine 1 (specifically, above the cylinder head 14) to cover the engine 1. The engine cover 4 guides the aerodynamic drag, flowing along a bottom face of the engine cover 4, toward the rear of the engine 1 (illustrated only in FIG. 2).

(Outline Configuration of Engine)

Described next is an outline configuration of the engine 1 included in the powertrain unit P.

In this exemplary configuration, the engine 1 is of a front-intake and rear-exhaust type. Specifically, the engine 1 includes: an engine body 10 having the four cylinders 11; an intake passage 30 provided in the front of the engine body 10 and communicating with each of the cylinders 11 via an intake port 18; and an exhaust passage 50 provided in the rear of the engine body 10 different from the front of the engine body 10, and communicating with each of the cylinders 11 via an exhaust port 19.

The intake passage 30 conducts gas (fresh air) introduced from outside, and supplies the gas inside the cylinders 11 of the engine body 10. In this exemplary configuration, the intake passage 30 is an intake system provided in the front of the engine body 10. The intake system is a combination of (i) multiple passages guiding the gas and (ii) devices such as a supercharger and an intercooler.

The engine body 10 burns in the cylinders 11 a mixture of fuel and the gas supplied from the intake passage 30. Specifically, the engine body 10 includes: an oil pan 12; the cylinder block 13 mounted on the oil pan 12; the cylinder head 14 placed on and coupled to the cylinder block 13; and a head cover 15 formed to overlie the cylinder head 14. The oil pan 12, the cylinder block 13, the cylinder head 14, and the head cover 15 are arranged in this order from bottom to top. Power generated through the combustion of the air-fuel mixture is delivered to the outside through the crankshaft 16 provided in the cylinder block 13.

Inside the cylinder block 13, the four cylinders 11 are formed. The four cylinders 11 are arranged in a line along the central axis of the crankshaft 16 (i.e., along the cylinder bank). Each of the four cylinders 11 has a cylindrical shape. The central axes of the cylinders 11 (hereinafter referred to as "cylinder axes") extend parallel to one another, and run perpendicularly to the cylinder bank direction. The four cylinders 11 shown in FIG. 1 may be hereinafter referred to as a first cylinder 11A, a second cylinder 11B, a third cylinder 11C, and a fourth cylinder 11D in this order from the right along the cylinder bank.

In the cylinder head 14, two intake ports 18 are provided for each cylinder 11 (shown only for the first cylinder 11A). The two intake ports 18 are arranged side by side along the cylinder bank, and communicate with the cylinder 11.

The two intake ports 18 are each provided with an intake valve (not shown). The intake valves open and close between a combustion chamber defined in the cylinder 11 and the intake ports 18. The intake valves are opened and closed by an intake valve train mechanism 20 at predetermined timing.

In this exemplary configuration, as illustrated in FIG. 4, the intake valve train mechanism 20 includes: an intake camshaft (camshaft) 21; and an electric intake sequential-valve timing (S-VT) 22 acting as a variable valve train mechanism changing a rotational phase of the intake camshaft 21. The electric intake S-VT 22 is an exemplary additional device of the engine 1.

The intake camshaft 21 is provided at the cylinder head 14, and rotatably supported in an orientation in which the central axis of the intake camshaft 21 and the engine output shaft run substantially in the same direction. The intake camshaft 21 is coupled to the crankshaft 16 through the power transmission mechanism 40 including a timing chain 41. The power transmission mechanism 40 transmits the power of the crankshaft 16 to the intake camshaft 21. As is commonly known, the power transmission mechanism 40 provides the intake camshaft 21 with a single turn while the crankshaft 16 makes two turns.

As illustrated in FIG. 4, the electric intake S-VT 22 is mounted on an end of the intake camshaft 21 toward the transmission 2 (i.e., a left end), and protrudes from a left side face of the cylinder head 14. Moreover, as illustrated in FIG. 4, the electric intake S-VT 22 is located near a boundary between the cylinder head 14 and the head cover 15 in the vehicle height direction, and protrudes at least above the cylinder head 14. Meanwhile, in the vehicle fore-aft direction, the electric intake S-VT 22 is located in the back of the cylinder head 14 as illustrated in FIG. 3.

The electric intake S-VT 22 includes: a sprocket gear 22a around which the timing chain 41 is wrapped, the sprocket gear 22a rotating in conjunction with the crankshaft 16; a planetary gear for adjusting a rotational phase of the camshaft gear in relation to the sprocket gear 22a; and an S-VT motor 22b driving the planetary gear. A detailed illustration of the electric intake S-VT 22 shall be omitted. The S-VT motor 22b is provided to a distal end of the electric intake S-VT 22 toward the transmission 2.

The electric intake S-VT 22 continuously changes a rotational phase of the intake camshaft 21 within a predetermined angular range. Accordingly, an opening time point and a closing time point of the intake valve change continuously. Note that the intake valve train mechanism 20 may include a hydraulic S-VT instead of the electric intake S-VT.

The cylinder head 14 also has two exhaust ports 19 provided for each cylinder 11. The two exhaust ports 19 communicate with the cylinder 11.

The two exhaust ports 19 are each provided with an exhaust valve (not shown). The exhaust valves open and close between the combustion chamber defined in the cylinder 11 and the exhaust port 19. The exhaust valves are opened and closed by an exhaust valve train mechanism 25 at predetermined timing.

In this exemplary configuration, as illustrated in FIG. 4, the exhaust valve train mechanism 25 includes: an exhaust camshaft (camshaft) 26; and an electric exhaust sequential-valve timing (S-VT) 27 acting as a variable valve train mechanism changing a rotational phase of an exhaust camshaft 26. The electric exhaust S-VT 27 is also an exemplary additional device of the engine 1.

The exhaust camshaft 26 is provided inside the cylinder head 14, and rotatably supported in a similar orientation as the intake camshaft 21 is supported. Specifically, the exhaust camshaft 26 is oriented in parallel with the intake camshaft 21, and placed behind, and adjacent to, the intake camshaft 21. The exhaust camshaft 26 is driven by the power transmission mechanism 40 to pivot.

The electric exhaust S-VT 27 is also mounted on an end of the exhaust camshaft 26 toward the transmission 2 (i.e., the left end), and protrudes from the left side face of the cylinder head 14. (Also see FIG. 10.) Similar to the electric intake S-VT 22, the electric exhaust S-VT 27 is located near the boundary between the cylinder head 14 and the head cover 15 in the vehicle height direction, and protrudes at least above the cylinder head 14. Meanwhile, in the vehicle fore-aft direction as illustrated in FIG. 3, the electric exhaust S-VT 27 is located in the front of the cylinder head 14, and adjacent to the electric intake S-VT 22 in the fore-aft direction.

The electric exhaust S-VT 27 includes a sprocket gear 27a and an S-VT motor 27b. The S-VT motor 27b is provided to a distal end of the electric exhaust S-VT 27 toward the transmission 2. The details of the electric exhaust S-VT 27 shall be omitted.

The exhaust passage 50 conducts exhaust gas discharged from the engine body 10 along with the combustion of the air-fuel mixture. Specifically, the exhaust passage 50 is provided behind the engine body 10, and communicates with the exhaust ports 19 of each cylinder 11. The exhaust passage 50 is provided with an exhaust emission control device 51 through a not-shown exhaust manifold.

In this exemplary configuration, the intake passage 50 is an intake system including a combination of (i) multiple passages guiding the gas and (ii) the exhaust emission control device 51.

As shown in FIG. 1, the intake passage 30 is connected to a side face in the front of the engine body 10, and the exhaust passage 50 is connected to a side face in the rear of the engine body 10. Outside the engine body 10 (on the left in FIG. 10), an EGR 60 is provided to connect the intake passage 30 and the exhaust passage 50 together in fluid communication. The EGR 60 allows part of the burned gas to flow back to the intake passage 30 external EGR gas. Specifically, the EGR 60 includes: an EGR passage 61 connecting the intake passage 30 and the exhaust passage 50 together; and an EGR cooler 62 interposed in the EGR passage 61. The EGR 60 is provided along an end of the engine body 10 along the engine output shaft.

The EGR passage 61 allows the burned gas, guided through the exhaust passage 50, to flow back to the intake passage 30. The EGR passage 61 has an upstream end connected to the exhaust passage 50 downstream of the exhaust emission control device 51. The EGR passage 61 has a downstream end connected to the intake passage 30 downstream of a throttle valve (not shown).

The EGR cooler 62 is a water-cooling cooler configured to circulate the coolant supplied from a water pump (an accessory) 71 in the EGR cooler 62. The EGR cooler 62 cools the burned gas guided through the exhaust passage 50.

—Cooling Circuit of Engine—

Figure 5:
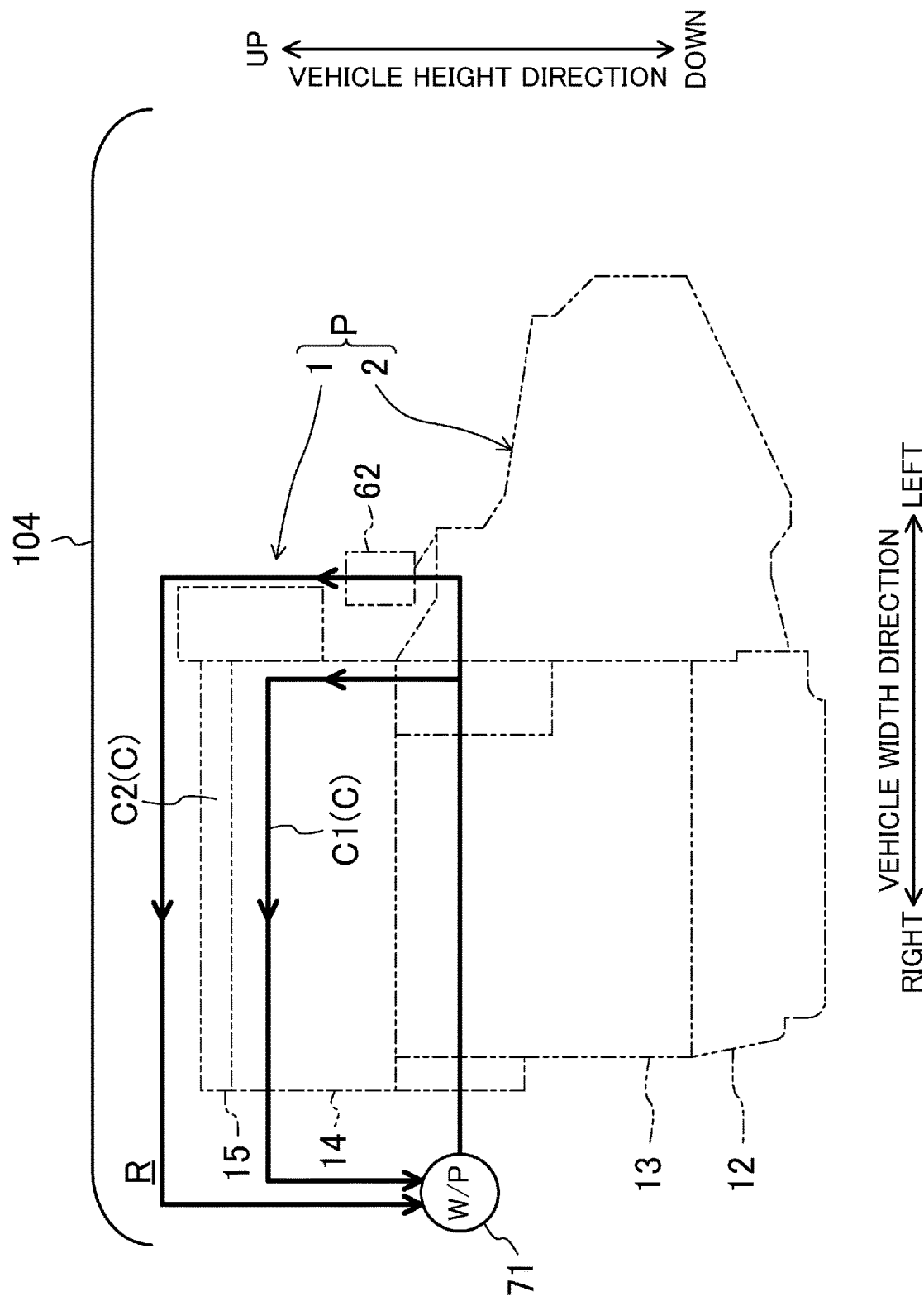
FIG. 5 schematically illustrates a cooling circuit of the engine.

FIG. 5 schematically illustrates a cooling circuit of the engine 1.

As illustrated in FIG. 5, the engine 1 has a cooling circuit C including: a first circuit C1 configured to pass the coolant discharged mainly from the water pump 71 through a block water jacket formed in the cylinder block 13, then through a head water jacket formed in the cylinder head 14, and sucked into the water pump 71; and a second circuit C2 branching off from the block water jacket in the first circuit C1, so that the coolant discharged from the water pump 71 bypasses the head water jacket and is sucked into the water pump 71.

As illustrated in FIG. 5, the EGR cooler 62 is interposed in the second circuit C2. In addition, the EGR cooler 62 is connected to the second circuit C2 directly downstream of the head water jacket. Hence, the coolant flowing out of the EGR cooler 62 passes through a not-shown heater core, and then is sucked into the water pump 71.

Note that the cooling circuit C includes a third circuit provided separately from the first circuit C1 and the second circuit C2. The third circuit branches off from the head water jacket in the first circuit C1, so that the coolant passes through a throttle valve and a water jacket formed around the exhaust ports 19 and is sucked into the water pump 71. The details of the third circuit shall be omitted.

The engine 1 illustrated in FIG. 4 is provided with a fuel pump 65, as an example of a kind of an accessory, for pressure feeding the fuel. As illustrated in FIG. 4, the fuel pump 65 is provided across an end face (i.e., a left side face 10L), of the engine 1 toward the transmission 2, from the transmission 2 in the cylinder bank direction.

(Configuration around Transmission)

As already described, the transmission 2 is mounted on the left side face of the above engine 1. Described below is a configuration of the engine 1 around the transmission 2 in a sequential order.

—Power Transmission Mechanism—

Figure 6:
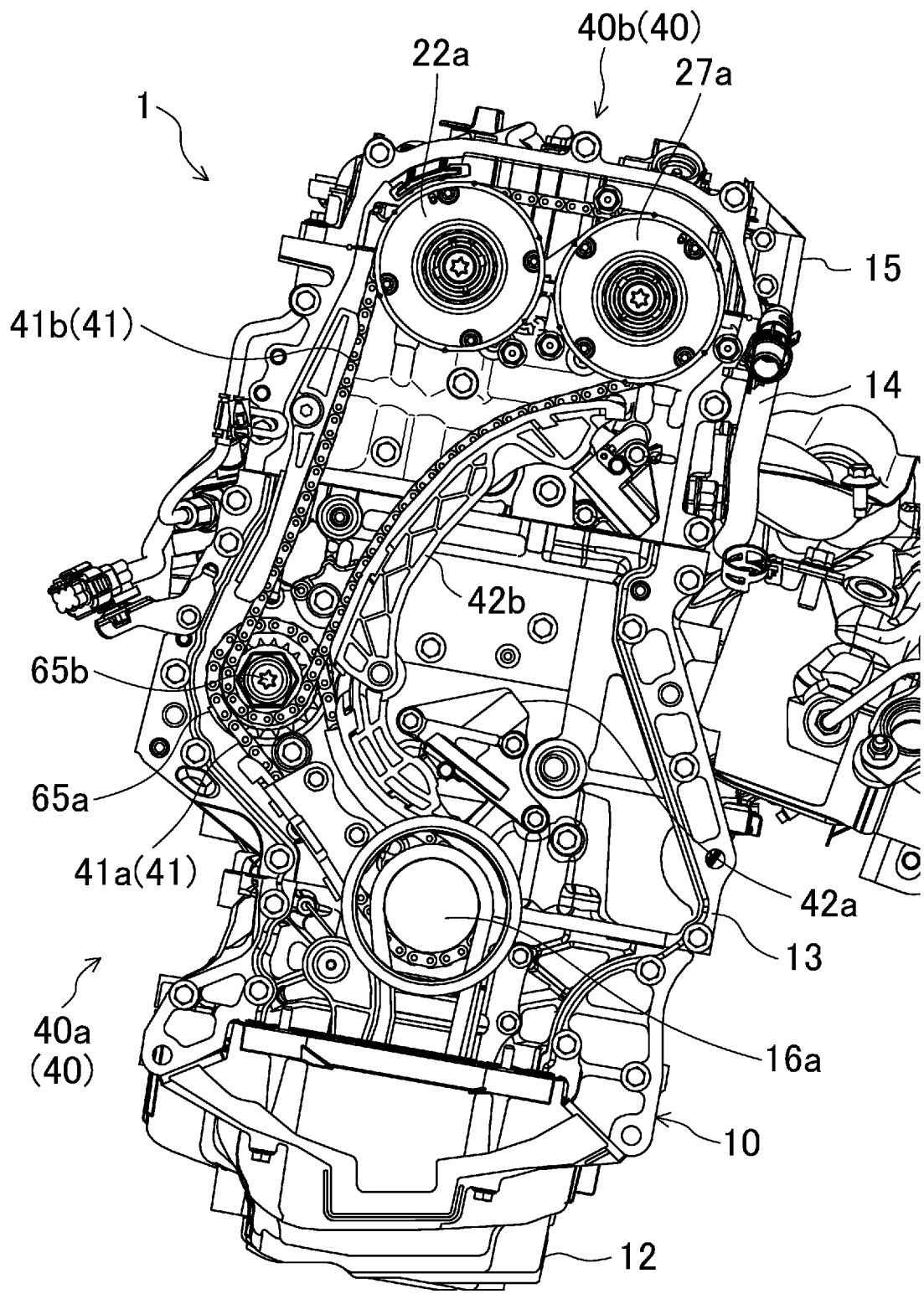
FIG. 6 illustrates a power transmission mechanism of the engine.
Figure 7:
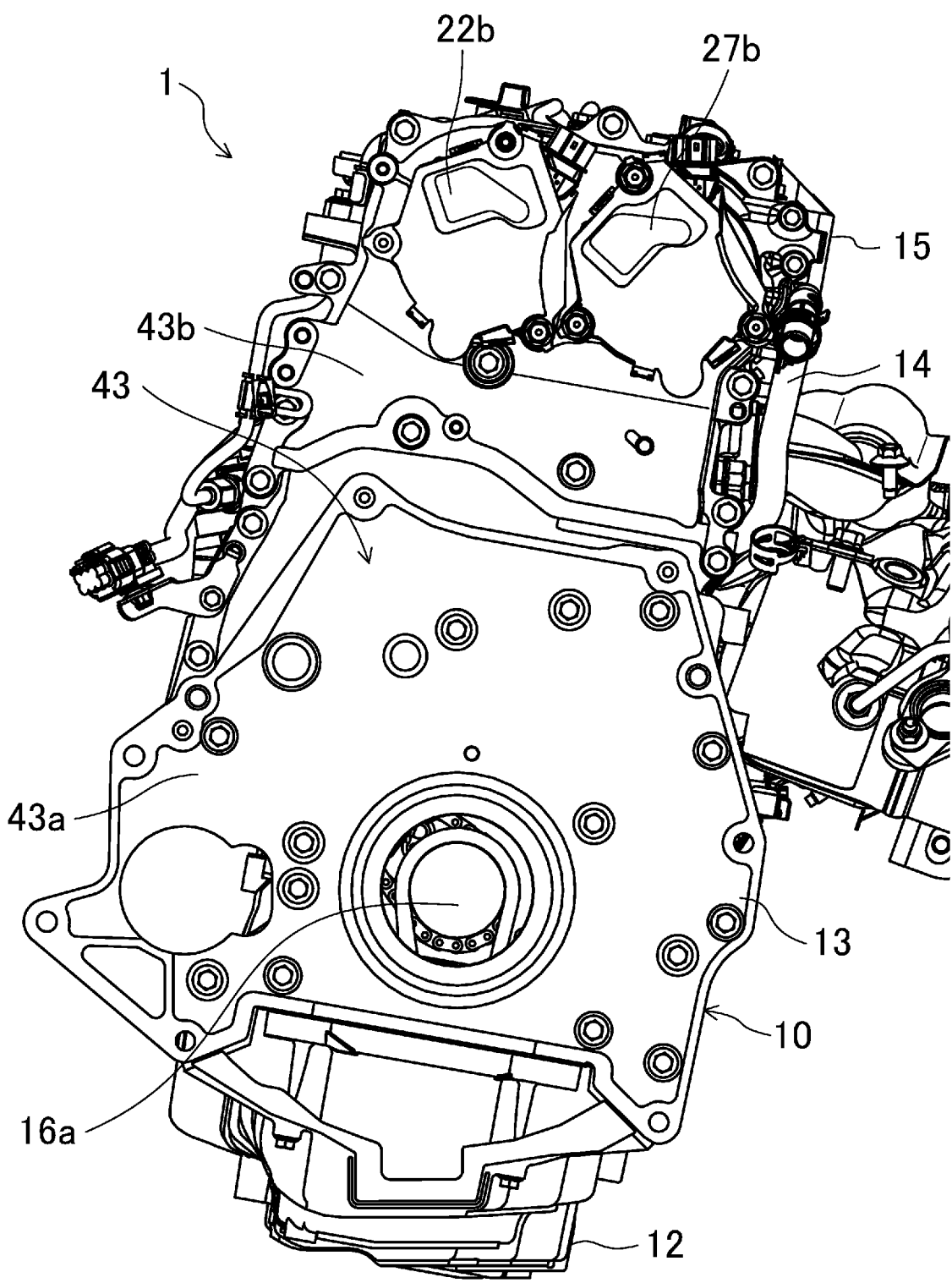
FIG. 7 illustrates a timing chain cover covering the power transmission mechanism.
Figure 8:
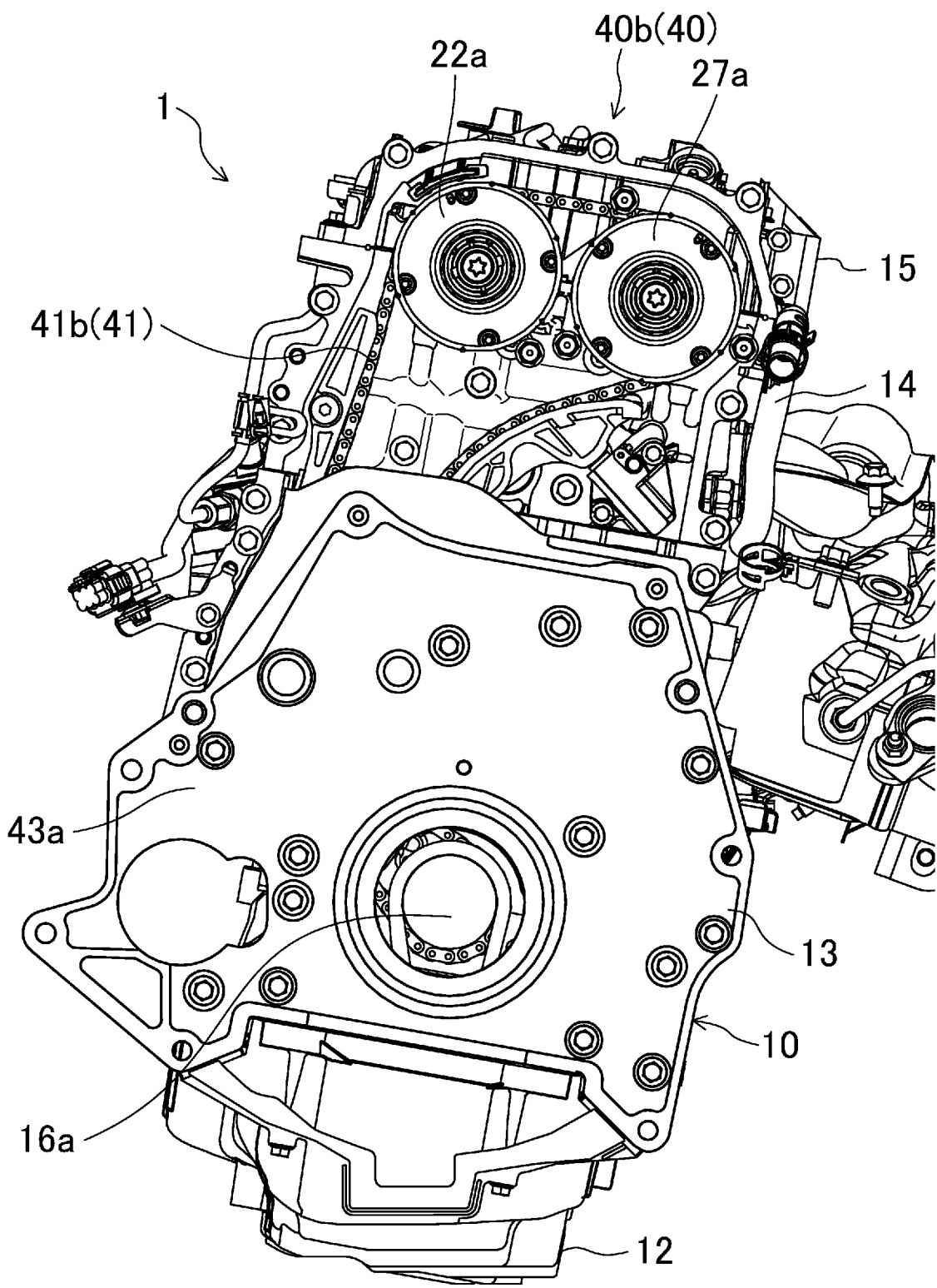
FIG. 8 illustrates the timing chain cover with a second cover alone removed.

FIG. 6 illustrates the power transmission mechanism 40 of the engine 1. FIG. 7 illustrates a timing chain cover 43 covering the power transmission mechanism 40. FIG. 8 illustrates the timing chain cover 43 with a second cover 43b alone removed.

The power transmission mechanism 40 is a gear drive system through the timing chain 41, and provided to a side face of the engine 1 toward the transmission 2 (specifically, to a left side face of the engine 1). In other words, the power transmission mechanism 40 is located between the engine 1 and the transmission 2 in the vehicle width direction.

The power transmission mechanism 40 drives various constituent elements such as the intake camshaft 21 and the exhaust camshaft 26. Specifically, the power transmission mechanism 40 includes: a first drive mechanism 40a for driving the fuel pump 65; and a second drive mechanism 40b for driving the intake camshaft 21 and the exhaust camshaft 26. Here, the timing chain 41 has two chains: a first chain 41a for transmitting power in the first drive mechanism 40a; and a second chain 41b for transmitting power in the second drive mechanism 40b.

Specifically, the first drive mechanism 40a has: a first sprocket 16a provided to a left end of the crankshaft 16; a second sprocket 65a provided to a left end of the fuel pump 65; the first chain 41a wrapped between the first sprocket 16a and the second sprocket 65a; and a first automatic tensioner 42a providing tension to the first chain 41a.

Specifically, as seen from FIG. 6, the first sprocket 16a is located in a lower half of the cylinder block 13 in the vehicle height direction, and in the center of the cylinder block 13 in the vehicle fore-aft direction.

Whereas, the second sprocket 65a is located in the center of the cylinder block 13 in the vehicle height direction, and at a front end of the cylinder block 13 in the vehicle fore-aft direction.

Meanwhile, the second drive mechanism 40b has: a third sprocket 65b provided in the fuel pump 65 in the left and an inner periphery of the second sprocket 65a; a sprocket gear 22a included in the electric intake S-VT 22; a sprocket gear 27a included in the electric exhaust S-VT 27; a second chain 41b wrapped among the third sprocket 65b and the sprocket gears 22a and 27a; and a second automatic tensioner 42b providing tension to the second chain 41b.

Specifically, similar to the second sprocket 65a, the third sprocket 65b is located in the center of the cylinder block 13 in the vehicle height direction, and in the front end of the cylinder block 13 in the vehicle fore-aft direction.

Moreover, similar to the electric intake S-VT 22 and the electric exhaust S-VT 27, the sprocket gears 22a and 27a are located near a boundary between the cylinder head 14 and the head cover 15 in the vehicle height direction, and provided above the cylinder head 14. Meanwhile, in the vehicle fore-aft direction, the sprocket gears 22a and 27a are arranged in the front-back direction.

When the crankshaft 16 pivots, the power from the crankshaft 16 is transmitted to the fuel pump 65 through the first sprocket 16a, the first chain 41a, and the second sprocket 65a. The fuel pump 65 is driven by the transmitted power.

Meanwhile, when the power transmitted from the crankshaft 16 causes the second sprocket 65a to pivot, the third sprocket 65b of the fuel pump 65 also pivots. Hence, the power is transmitted to the sprocket gears 22a and 27a through the second chain 41b. The transmitted power causes the intake camshaft 21 and the exhaust camshaft 26 to pivot. Then, the intake valves and the exhaust valves operate.

The above power transmission mechanism 40 is covered with a timing chain cover (a timing system cover) 43. This timing chain cover 43 is provided in association with each of the cylinder head 14 and the cylinder block 13, and covers the left side face (specifically, the left side faces of the cylinder block 13, the cylinder head 14, and the head cover 15) of the engine 1.

The timing chain cover 43 is located between the engine 1 and the transmission 2 in the vehicle width direction. Specifically, the timing cover 43 is fastened to the left side face of the engine 1. In this fastened state, the transmission 2 is mounted on a left face of the timing chain cover 43. In other words, the engine 1 and the transmission 2 constitute a single unit through the timing chain cover 43.

The timing chain cover 43 according to this first embodiment includes: a first cover 43a on which the transmission 2 is mounted; a second cover 43b provided above the first cover 43a and covering a side of the cylinder head 14 toward the transmission 2.

Specifically, as illustrated in FIGS. 6 to 8, the first cover 43a is mounted on the left side face of the cylinder block 13, and provided with an insertion hole of the crankshaft 16 and a fastener for fastening the transmission 2 on the first cover 43a.

In contrast, the second cover 43b is mounted on the left side faces of the cylinder head 14 and the head cover 15, and has not-shown openings each corresponding to one of the sprocket gears 22a and 27a. Hence, when the second cover 43b is mounted on the engine 1, the sprocket gears 22a and 27a are exposed from the second cover 43b through the openings. The S-VT motor 22b is mounted on the exposed portion of the sprocket gear 22a, and the S-VT motor 27b is mounted on the exposed portion of the sprocket gear 27a. As illustrated in FIG. 7, a protector is additionally attached to each of the mounted S-VT motors 22b and 27 so that the electric intake S-VT 22 and the electric exhaust S-VT 27 are configured.

Note that, as schematically illustrated in FIG. 4, a belt-driven power transmission mechanism (an accessory drive mechanism) 70 is provided to a side of the engine 1 across from the transmission 2; that is, specifically, a right side of the engine 1 (see FIG. 2). Specifically, the power transmission mechanism (the accessory drive mechanism) 70 drives various accessories of the engine 1 such as the water pump 71 and an air conditioner (not shown).

—EGR—

Figure 9:
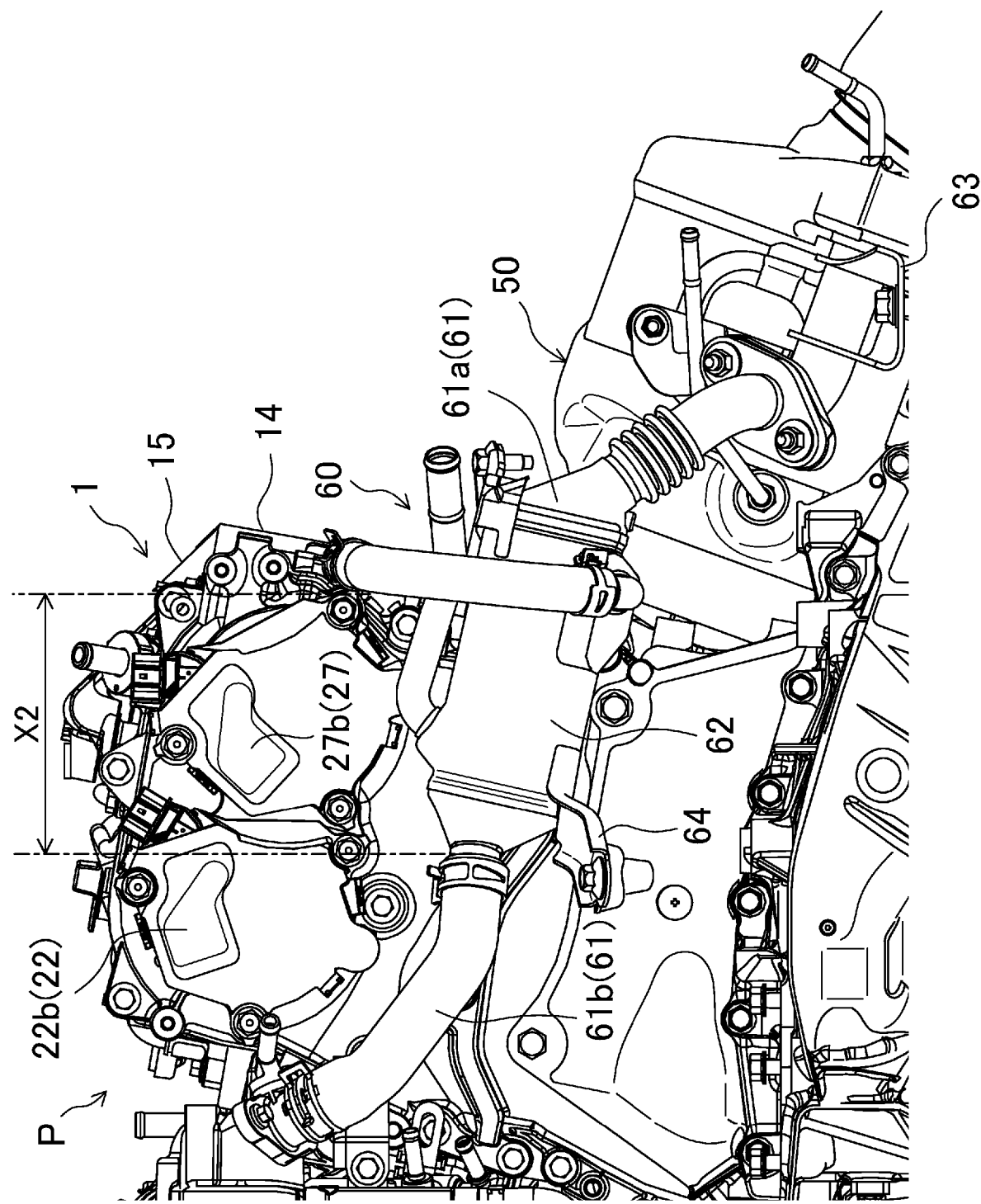
FIG. 9 illustrates how a variable valve mechanism and an EGR are located in relation to each other when viewed from the left.
Figure 10:
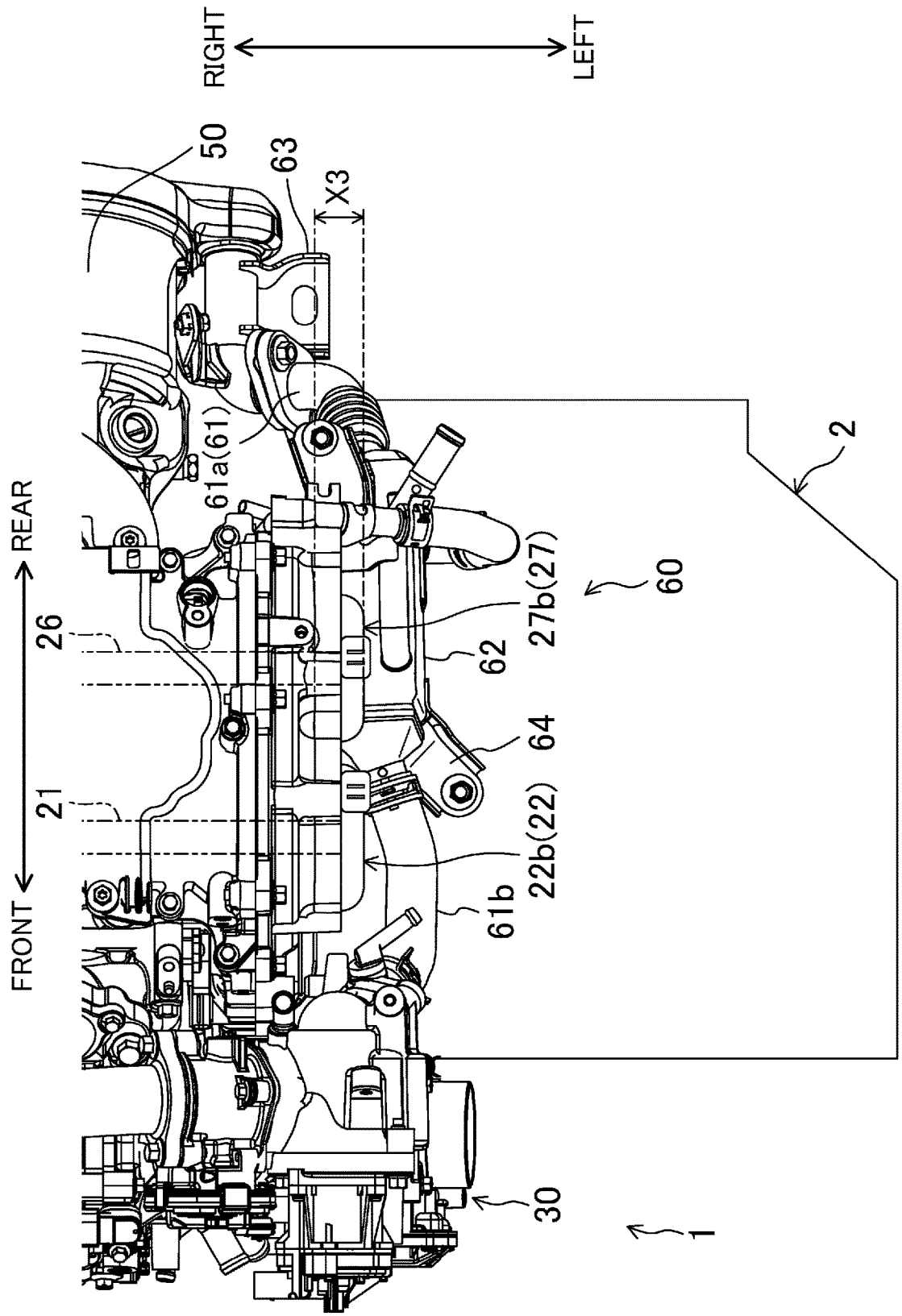
FIG. 10 illustrates how the variable valve mechanism and the EGR are located in relation to each other when viewed from above.
Figure 11:
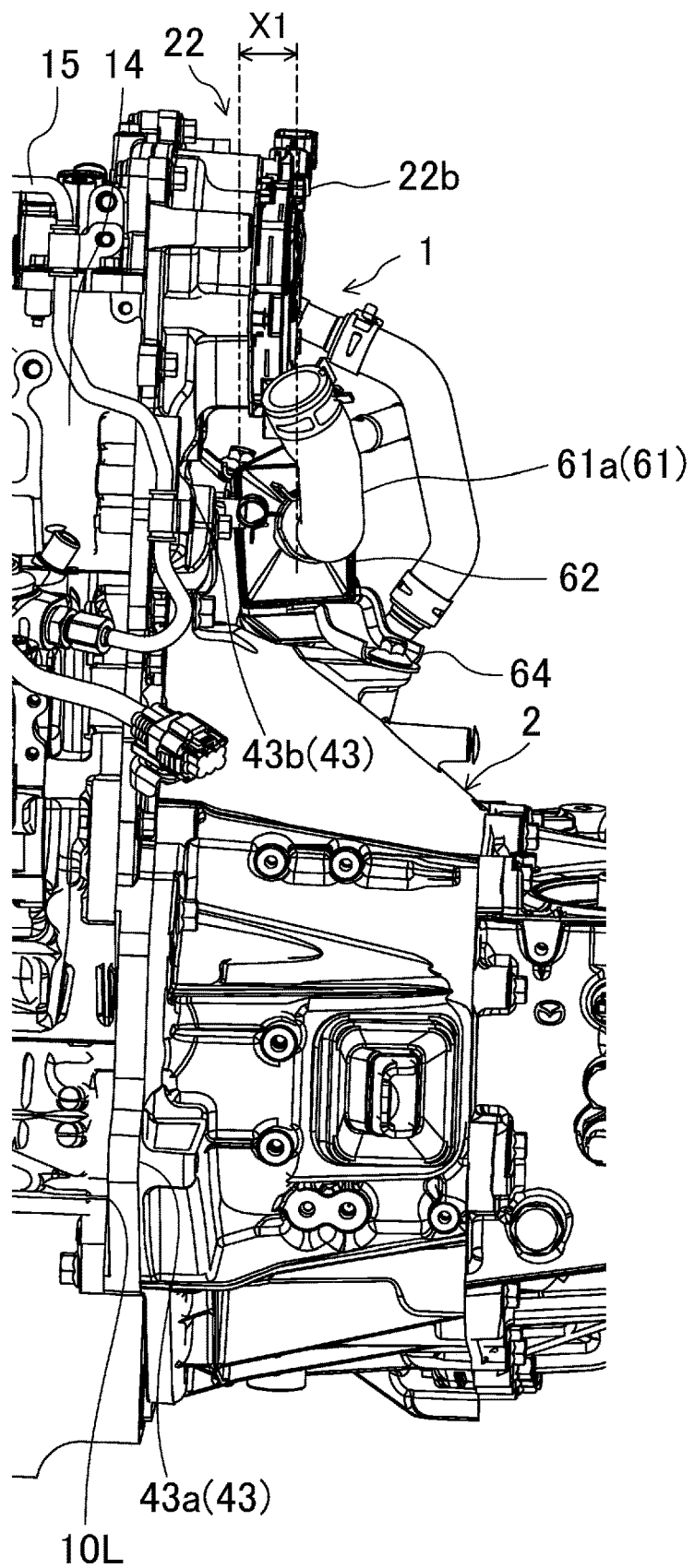
FIG. 11 illustrates how the variable valve mechanism and the EGR are located in relation to each other when viewed from the front.
Figure 12:
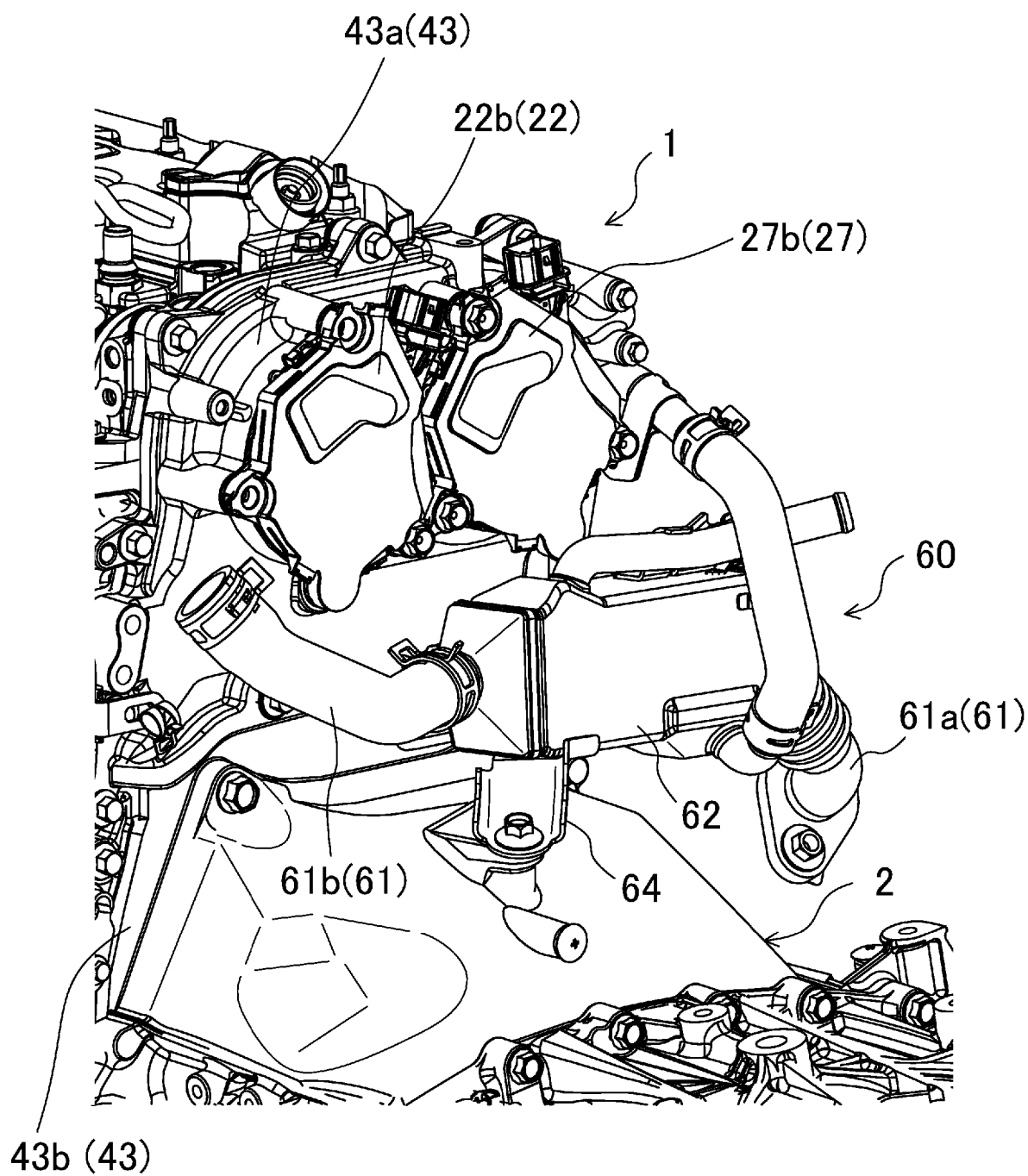
FIG. 12 illustrates a support structure of the EGR viewed from obliquely forward left.
Figure 13:
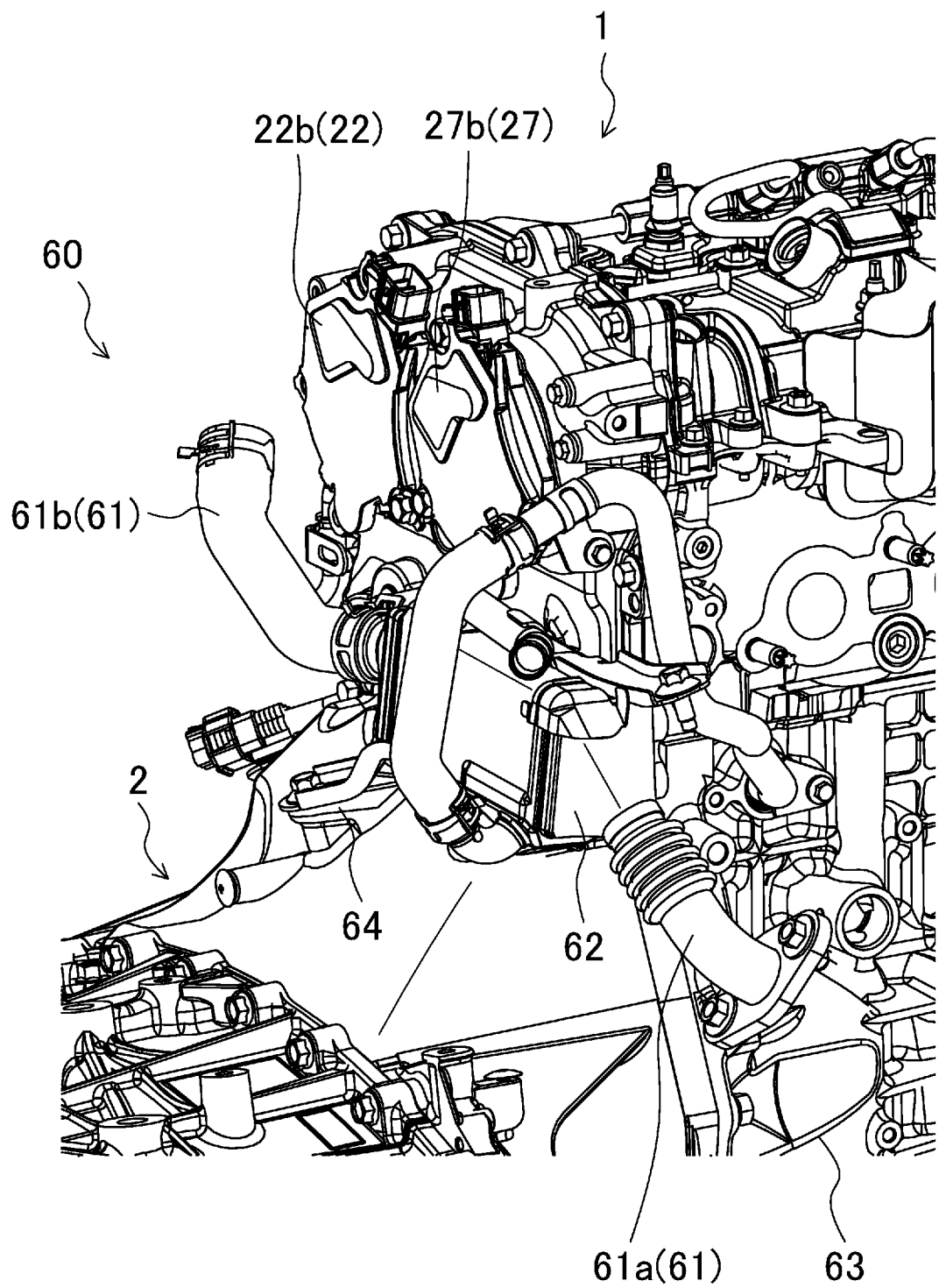
FIG. 13 illustrates a support structure of the EGR viewed from obliquely backward left.

FIG. 9 illustrates how the electric intake S-VT 22 and the electric exhaust S-VT 27 as variable valve mechanisms and the EGR 60 are located in relation to one another when viewed from the left. Moreover, FIG. 10 illustrates such relative locations viewed from above. FIG. 11 illustrates the relative locations viewed from the front. Furthermore, FIG. 12 illustrates a support structure of the EGR cooler 62 viewed from obliquely forward left. FIG. 13 illustrates the support structure viewed from obliquely backward left.

As illustrated in FIG. 9, the EGR passage 61 included in the EGR 60 branches off from the exhaust passage 50 downstream of the exhaust emission control device 51, and is connected to the intake passage 30.

As already described, the EGR passage 61 has the EGR cooler 62 interposed therein to cool the gas passing through the EGR passage 61. Hereinafter, in the EGR passage 61, a connection between the exhaust passage 50 and the EGR cooler 62 is referred to as an upstream EGR passage 61a; whereas, a connection between the EGR cooler 62 and the intake passage 30 is referred to as a downstream EGR passage 61b.

Specifically, as illustrated in FIGS. 10 to 12, the upstream EGR passage 61a extends obliquely upward and forward along a left part of the exhaust passage 50. Then, the upstream EGR passage 61a turns left not to interfere with a left part of the engine body 10. Then, the upstream EGR passage 61a extends obliquely upward and forward again to reach the EGR cooler 62. As already described, the upstream end of the upstream EGR passage 61a is connected to the exhaust passage 50 downstream of the exhaust emission control device 51; whereas a downstream end (a front end) of the upstream EGR passage 61a is connected to an upstream end (a rear end) of the EGR cooler 62.

More specifically, as illustrated in FIGS. 9 and 10, the upstream EGR passage 61a is provided above the rear end of the transmission 2 in the vehicle height direction; whereas, in the vehicle width direction, the upstream EGR passage 61a is provided substantially in the same location of the electric intake S-VT 22 and the electric exhaust S-VT 27. Moreover, the upstream EGR passage 61a is provided with a first bracket 63. Although not shown, the upstream EGR passage 61a is supported by the transmission 2 through the first bracket 63.

The EGR cooler 62 is shaped into a square tube slightly angled with respect to the fore-aft direction. At least when the engine 1 is mounted in the vehicle, the EGR cooler 62 is provided in an orientation in which openings of both ends of the EGR cooler 62 face in the obliquely front-aft direction. The upstream end of the EGR cooler 62 is directed obliquely downward and backward, and, as already described, connected to the downstream end of upstream EGR passage 61a. Meanwhile, the downstream end (front end) of the EGR cooler 62 is directed obliquely upward and forward, and connected to the upstream end (rear end) of the downstream EGR passage 61b.

As illustrated in, for example, FIG. 10, the EGR cooler 62 has a cross-section perpendicular to the flow direction of the gas (i.e., a cross-sectional flow area) larger than the cross-sectional flow areas of the upstream EGR passage 61a and the downstream EGR passage 61b.

To be more specific, as illustrated in FIGS. 9, 10, and 11, the EGR cooler 62 is provided along the left side face of the cylinder head 14 toward the transmission 2. As can be seen from FIG. 11, in the vehicle width direction, the EGR cooler 62 is spaced apart from the second cover 43b mounted on the left side face of the cylinder head 14.

In a direction from the cylinder head 14 toward the cylinder block 13 (in this exemplary configuration, substantially the same as the vehicle height direction), the EGR 60 is located closer to the cylinder block 13 than to the electric intake S-VT 22 and the electric exhaust S-VT 27. In addition, when viewed from the cylinder block 13 along the vehicle height direction, at least a part of the EGR 60, the electric intake S-VT 22, and the electric exhaust S-VT 27 are arranged to overlap with one another.

Here, a double-headed arrow X1 in FIGS. 4 and 11, a double-headed arrow X2 in FIG. 9, and a double-headed arrow X3 in FIG. 10 each indicate how the EGR cooler 62 and the electric exhaust S-VT 27 are located in relation to each other. As indicated by the double-headed arrows X1 to X3, when the EGR 60 is observed from the cylinder block 13 in the direction from the cylinder head 14 toward the cylinder block 13, the EGR cooler 62 and the electric exhaust S-VT 27 are arranged to overlap with each other.

Specifically, as illustrated in FIG. 10, the EGR cooler 62 is located below (in particular directly below) the electric exhaust S-VT 27 in the vehicle height direction, and above (in particular directly above) the transmission 2. That is, in the vehicle height direction, the EGR cooler 62 is located between the electric exhaust S-VT 27 and the transmission 2. In addition, when viewed from above in the vehicle height direction, the EGR cooler 62 and the electric exhaust S-VT 27 are arranged to overlap with each other.

Furthermore, as illustrated in FIGS. 12 and 13, the EGR cooler 62 is provided with a second bracket 64. Through the second bracket 64, the EGR cooler 62 is supported by the transmission 2. Specifically, the second bracket 64 provided to the EGR cooler 62 is fastened to the center, in the vehicle fore-aft direction, of a top face of the transmission 2.

The downstream EGR passage 61b extends upward as running along the flow of the gas from upstream to downstream. Specifically, as illustrated in FIGS. 9 and 10, the downstream EGR passage 61b extends obliquely upward and forward along the left part of the engine 1, and turns substantially forward. As already described, the upstream end (rear end) of the downstream EGR passage 61b is connected to the downstream end of upstream EGR cooler 62. Meanwhile, the downstream end (front end) of the downstream EGR passage 61b is connected to the rear of the intake passage 30.

To be more specific, as illustrated in FIGS. 9, 10, and 11, the downstream EGR passage 61b is provided along the left side face of the cylinder head 14 toward the transmission 2 as the EGR cooler 62 is provided so. In the vehicle width direction, the downstream EGR passage 61b is spaced apart from the second cover 43b mounted on the left side face of the cylinder head 14.

Moreover, as illustrated in FIG. 10, the downstream EGR passage 61b is located below (in particular directly below) the electric intake S-VT 22 in the vehicle height direction, and above (in particular directly above) the transmission 2. That is, in the vehicle height direction, the downstream EGR passage 61b is located between the electric intake S-VT 22 and the transmission 2.

—Serviceability of Powertrain Unit—

When the powertrain unit P described in the first embodiment is overhauled (in particular, a valve system of the engine 1 is overhauled), the cylinder head 14 may be removed from the engine 1. Even though the engine 1 is mounted in the motor vehicle 100, such overhaul service needs to be carried out smoothly.

Meanwhile, the EGR 60 has usually been supported by the cylinder head 14. However, when the cylinder head 14 is to be removed for the overhaul service, such a configuration requires the EGR 60 to be removed in advance from the cylinder head 14.

The EGR 60 includes multiple devices such as the EGR passage 61 connecting the exhaust passage 50 and the intake passage 30 of the engine 1, and the EGR cooler 62 for cooling burned gas. Hence, removing the EGR 60 from the cylinder head 14 takes time, and thus is inconvenient for smooth overhaul of the engine 1. In such a case, a space is required to store the removed EGR 60. In view of this extra space required, the EGR 60 has room for improvement for smooth overhaul service.

The EGR 60 could be supported by the vehicle body. However, considering that the EGR 60 is connected to both the intake passage 30 and the exhaust passage 50, such a support structure could transmit a vibration caused by an operation of the engine 1 to the automotive body through the EGR 60 when the vibration enters the EGR 60 through the intake passage 30 and the exhaust passage 50. The transmission of the vibration deteriorates noise vibration and harshness (NVH) characteristics of the vehicle, and is not preferable.

However, as illustrated in FIGS. 10 to 13, the EGR 60 according to this first embodiment is supported not by the cylinder head 14 but by the transmission 2 rigidly coupled to the engine 1. Hence, when the cylinder head 14 is to be removed, such a feature eliminates the need for a process of removing the EGR 60 from the cylinder head 14. As a result, the feature successfully reduces the number of processes, improving serviceability of the powertrain unit P.

Moreover, the transmission 2 as well as the engine 1 is supported with respect to the automotive body through the mount although the details of the configuration shall be omitted. Compared with a configuration of supporting the EGR 60 by the automotive body, supporting the EGR 60 by the transmission 2 makes it possible to reduce the transmission of the vibration through the EGR 60. In other words, the EGR 60 does not act as a source of the vibration to enter the automotive body. This is advantageous in achieving NVH characteristics.

As a result, such a feature successfully improves serviceability of the powertrain unit P without deteriorating the NVH characteristics.

Furthermore, compared with other elements such as the EGR passage 61 included in the EGR 60, the EGR cooler 62 weighs extra for a circulating coolant.

As shown in FIGS. 10 to 13, the EGR cooler 62 weighing extra is supported by the transmission 2. Such a feature can implement a more stable support structure.

As illustrated in FIG. 5, in the cooling circuit C of the engine 1, the EGR cooler 62 is interposed not in the first circuit C1 but in the second circuit C2. Such a feature makes it possible to reduce a heat flow rate inside the engine 1 for bypassing the cylinder head 14. As a result, a coolant having a relatively low temperature can be supplied to the EGR cooler 62. The lower the temperature of the coolant is, the higher the cooling performance of the EGR cooler 62 can be. Hence, the EGR cooler 62 can be downsized.

Downsizing the EGR cooler 62 is advantageous in obtaining a larger workspace in the engine compartment R. In other words, near the EGR cooler 62, such service as removing the timing chain cover 43 can be carried out more smoothly. This is advantageous in improving serviceability of the powertrain unit P.

Moreover, as illustrated in FIGS. 6 to 8, the timing chain cover 43 is divided into the first cover 43a and the second cover 43b. The first cover 43a is provided with the transmission 2; whereas, the second cover 43b covers a side of the cylinder head 14. Hence, when the cylinder head 14 is to be removed from the engine 1, the transmission 2 does not have to be dismounted from the timing chain cover 43 for removing the entire timing chain cover 43. Instead, all that need is to remove the second cover 43b alone without dismounting the transmission 2 from the engine 1. This is advantageous in improving serviceability of the powertrain unit P.

Furthermore, as illustrated in FIGS. 10 to 13, the electric intake S-VT 22 and the electric exhaust S-VT 27 are mounted on the second cover 43b. Considered here is that the EGR 60 is provided below the electric intake S-VT 22 and the electric exhaust S-VT 27. In removing, for example, the cylinder head 14, such a feature can reduce the risk of interference of the EGR 60 with the electric intake S-VT 22 and the electric exhaust S-VT 27 when the electric intake S-VT 22 and the electric exhaust S-VT 27 are to be removed from the second cover 43b. As a result, such a feature facilitates the removal of the cylinder head 14, and is eventually advantageous in improving serviceability of the powertrain unit P.

Moreover, as illustrated in FIG. 11, the EGR 60 is spaced apart from the second cover 43b along the engine output shaft (in the vehicle width direction). Such a feature is advantageous in reducing the risk that a vibration caused by an operation of the engine 1 enters the EGR 60 through the second cover 43b. This curbs noise to be released from the EGR cooler 62, and is advantageous in achieving NVH characteristics.

As described in the first embodiment, the electric intake S-VT 22 and the electric exhaust S-VT 27 may be mounted on the engine 1 provided with the EGR 60. Such variable valve mechanisms could be mounted on the left ends of the intake camshaft 21 and the exhaust camshaft 26. Depending on how the variable valve mechanisms are located in relation to the EGR 60, in particular to the EGR cooler 62 of the EGR 60, the engine 1 would increase in size. This is disadvantageous in downsizing the powertrain unit P.

However, as illustrated in FIG. 4, the electric intake S-VT 22 and the electric exhaust S-VT 27 mounted on the engine 1 inevitably protrude from an end of the engine 1 along the engine output shaft. A space is defined below the protruding electric intake S-VT 22 and electric exhaust S-VT 27. Utilizing the space, the EGR 60 can be provided in the space.

In particular, as illustrated in FIG. 10, at least a part of the EGR 60 (specifically the EGR cooler 62) and the electric exhaust S-VT 27 acting as a variable valve mechanism (i.e., a part protruding from the left end of the engine 1 along the engine output shaft) are arranged to overlap with each other when viewed from the cylinder head 14 toward the cylinder block 13. Such an arrangement makes it possible to reduce the size of the engine 1 along the engine output shaft, contributing to downsizing the powertrain unit P.

Hence, the powertrain unit P can be downsized.

Second Embodiment

Figure 14:
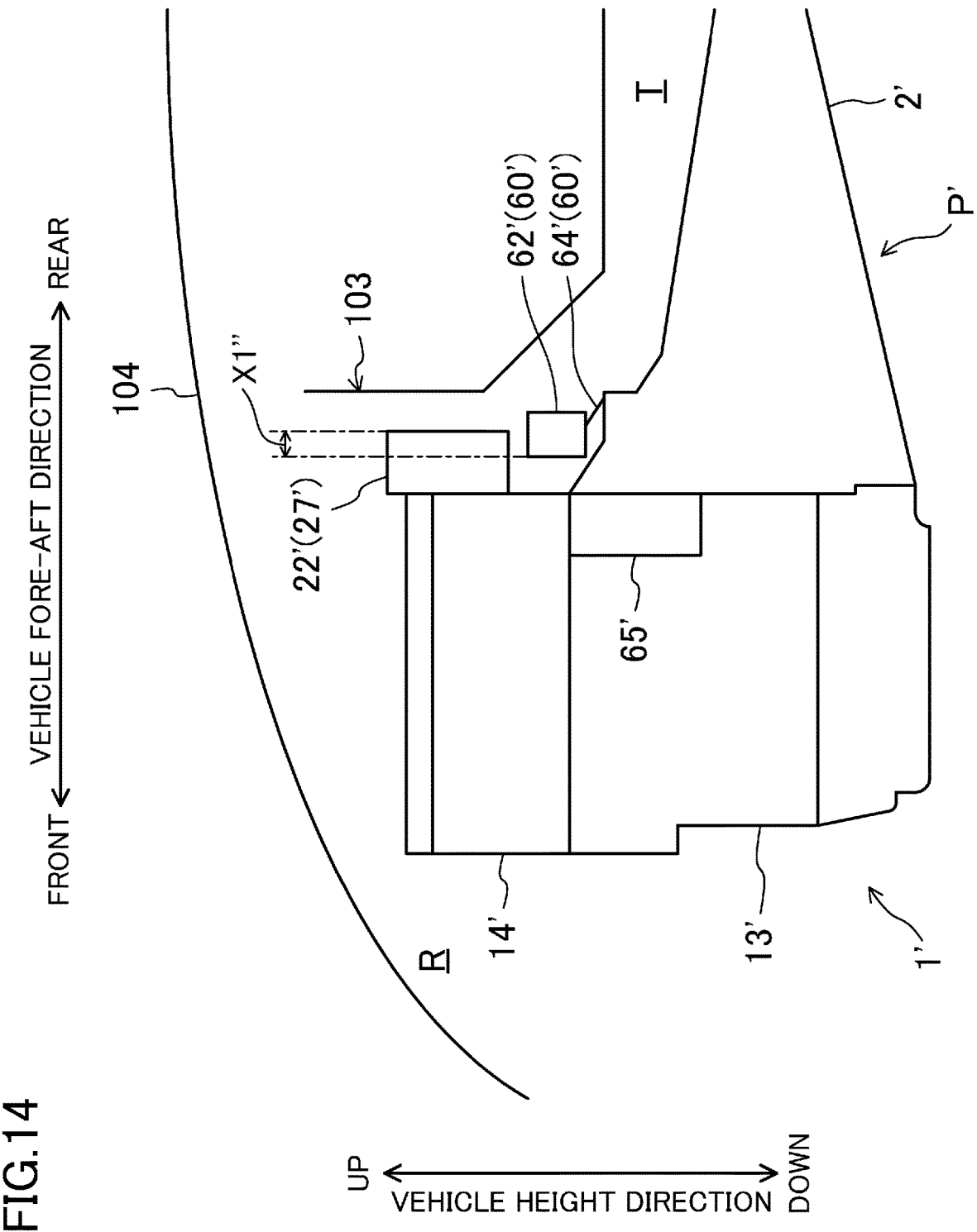
FIG. 14 corresponds to FIG. 4 and illustrates a schematic layout of a powertrain unit for a front-engine, rear-wheel drive (FR) vehicle.

As a second embodiment, described next is a powertrain unit P' mounted in an FR vehicle. FIG. 14 corresponds to FIG. 4 and illustrates a schematic layout of the powertrain unit P' for an FR vehicle.

Hereinafter, descriptions of configurations in common with those in the first embodiment may be omitted as appropriate.

The powertrain unit P' includes an engine 1' and a transmission 2' coupled to the engine 1'. The engine 1' is an inline-four longitudinal engine such that the engine fore-aft direction (the cylinder bank direction) is substantially the same as the vehicle fore-aft direction, and the engine width direction is substantially the same as the vehicle width direction. Meanwhile, the transmission 2' transmits power of the engine 1' to rotate and drive a drive shaft through a not-shown propeller shaft.

Similar to the first embodiment, the hood 104 gradually rises from the front to the rear in the vehicle fore-aft direction.

For the engine 1', the engine output shaft is in parallel with the vehicle fore-aft direction, and an electric exhaust S-VT 22' and an electric exhaust S-VT 27' face the dash panel 103 as a partition. Meanwhile, the transmission 2' is located behind, and next to, the engine 1', and inserted in the tunnel T of the dash panel 103.

Moreover, similar to the first embodiment, the fuel pump 65' is provided across a left side face (i.e., a left side face 10L) of the engine 1 from the transmission 2. Considering that the dash panel 103 is provided behind the engine 1', such a feature is advantageous in reducing the risk of contact between the fuel pump 65' and the dash panel 103 when, for example, the vehicle comes into collision.

Similar to the first embodiment, an EGR 60' is provided between (i) the electric intake S-VT 22' and the electric exhaust S-VT 27' and (ii) the transmission 2' in the vehicle height direction. Although not shown in detail, at least a part of the EGR 60', the electric intake S-VT 22', and the electric exhaust S-VT 27' are arranged to overlap with one another when observed from above in the vehicle height direction. Such an arrangement makes it possible to downsize the powertrain unit P' as seen in the first embodiment.

Furthermore, similar to the first embodiment, the EGR 60' is supported along a side (a rear side) of the cylinder head 14' toward the transmission 2'; that is, the EGR 60' is provided along an end of the engine 1 along the engine output shaft. In addition, the EGR 60' is supported by the transmission 2' via a bracket (a second bracket 64'). Similar to the first embodiment, such a support structure successfully improves serviceability of the powertrain unit P' without deteriorating NVH characteristics.

In recent years, the height of the hood 104 has been required to be lowered in view of a sophisticated design and improved aerodynamic characteristics of the motor vehicle 100' Considering that a typical motor vehicle has the hood 104' gradually rising from the front toward the rear, the powertrain unit P' needs to be provided toward the rear as much as possible, and such devices as the variable valve mechanism which could protrude above the cylinder head 14' and the cylinder block 13' are required to be provided to the rear of the engine 1' in order to lower the overall height of the hood 104 without changing the size of the powertrain unit P' itself.

As illustrated in FIG. 14, the engine 1' is positioned so that the electric exhaust S-VT 22' and the electric exhaust S-VT 27' face the dash panel 103 provided behind the engine 1'. Such a positioning of the engine 1' is equivalent to providing the electric intake S-VT 22' and the electric exhaust S-VT 27' to the rear of the engine 1', which is advantageous in lowering the overall height of the hood 104.

In such a positioning, the electric intake S-VT 22', the electric exhaust S-VT 27', and the EGR 60 are located in relation to one another as described above, so that the size of the engine 1' can be reduced along the engine output shaft; that is, the vehicle fore-aft direction. Hence, by the reduced size of the engine 1' in the vehicle fore-aft direction, the engine 1' can be provided further toward the rear and closer to the dash panel 103. This allows the overall height of the hood 104 to be lowered.

Moreover, when the transmission 2' is inserted in the tunnel T, the whole powertrain unit P' can be provided to the rear of the engine compartment R. This is also advantageous in lowering the overall height of the hood 104.

Third Embodiment

Figure 15:
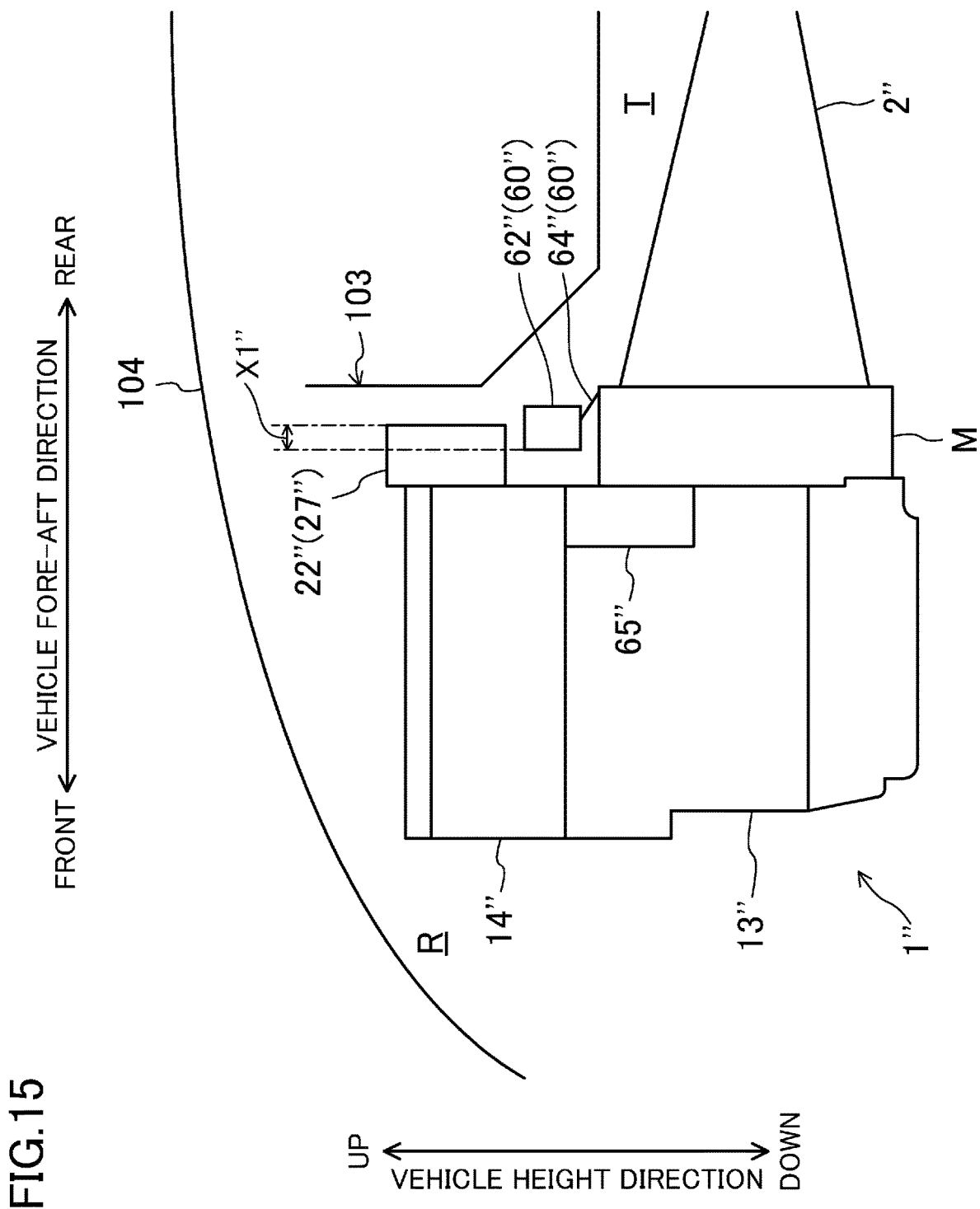
FIG. 15 corresponds to FIG. 4 and illustrates a schematic layout of a powertrain unit for a hybrid vehicle (HV).

As a third embodiment, described next is a powertrain unit P'" mounted in a hybrid FR vehicle. FIG. 15 corresponds to FIG. 4 and illustrates a schematic layout of the powertrain unit P'" for a hybrid vehicle (HV).

Hereinafter, descriptions of configurations in common with those in the first and second embodiments may be omitted as appropriate.

The powertrain unit P'" includes: an engine 1"; a transmission 2" coupled to the engine 1"; and an HV motor (motor) M interposed between the engine 1" and the transmission 2". Similar to the second embodiment, the engine 1'" is an inline-four longitudinal engine such that the engine fore-aft direction (the cylinder bank direction) is substantially the same as the vehicle fore-aft direction, and the engine width direction is substantially the same as the vehicle width direction.

Here, the engine 1" is in an orientation in which the electric intake S-VT 22" and the electric exhaust S-VT 27" face the dash panel 103. Meanwhile, the transmission 2" is located to the rear of the engine 1" across from the HV motor M, and inserted in the tunnel T of the dash panel 103 behind the engine 1".

An EGR 60" is different from the EGR 60 in the first embodiment and the EGR 60' in the second embodiment. The EGR 60" is provided between (i) the electric intake S-VT 22" and the electric exhaust S-VT 27" and (ii) the HV motor M in the vehicle height direction. Although not shown in detail, at least a part of the EGR 60", the electric intake S-VT 22", and the electric exhaust S-VT 27" are arranged to overlap with one another when observed from above in the vehicle height direction. Such an arrangement makes it possible to downsize the powertrain unit P'" as seen in the first and second embodiments.

Furthermore, the EGR 60" is provided along an end of the engine 1" along the engine output shaft. However, the EGR 60" is different from the EGR 60 in the first embodiment and the EGR 60' in the second embodiment, and provided along a side (a rear side) of the cylinder head 14' toward the HV motor M. In addition, the EGR 60" is supported by the HV motor M via a bracket (a second bracket 64"). Similar to the first and second embodiments, such a support structure successfully improves serviceability of the powertrain unit P'" without deteriorating NVH characteristics.

Other Embodiments

In the first to third embodiments, the electric intake S-VT 22, the electric exhaust S-VT 27, and the EGR 60 are arranged in the rear of the engine 1; however, the arrangement shall not be limited to such an arrangement. For example, the electric intake S-VT 22, the electric exhaust S-VT 27, and the EGR 60 may be provided in the front of the engine 1.

In the first embodiment, the EGR cooler 62 shall be supported only by the transmission 2; however, the support shall not be limited to such a supporting manner. For example, the EGR cooler 62 may be supported by the cylinder block 13 and the transmission 2. Such a support structure also improves serviceability around the cylinder head 14.

Furthermore, in the first embodiment, the power transmission mechanism 40 is a gear drive system through the timing chain 41. However, the power transmission mechanism 40 shall not be limited to such a drive system. For example, the power transmission mechanism 40 may be a belt drive system.

What is claimed is:

1. An automotive powertrain unit comprising:
    an engine having a cylinder block and a cylinder head coupled to the cylinder block;
    a transmission coupled to an end of the engine along an engine output shaft, and mounted on a side of the cylinder block; and
    an additional device, wherein
    the engine includes:
        an intake passage connected to one side of the engine and an exhaust passage connected to an other side of the engine different from the one side; and
        an external exhaust gas recirculator (EGR) connecting the intake passage and the exhaust passage together in fluid communication,
    the EGR is provided along the end of the engine along the engine output shaft,
    a timing system cover is provided along the engine output shaft between (i) the EGR and (ii) the cylinder block and the cylinder head, the timing system cover being mounted on the cylinder head,
    the EGR is supported by the transmission,
    the timing system cover includes: a first cover mounted on the cylinder block, and provided with the transmission; and a second cover mounted on the cylinder head,
    the second cover is provided with the additional device,
    at least a part of the EGR is provided between the additional device and the transmission, and
    the additional device is at least one selected from the group consisting of a variable valve timing system and a fuel pump.

2. The automotive powertrain unit of claim 1, wherein
    the EGR includes: an EGR passage; and
    an EGR cooler interposed in the EGR passage, and
    the EGR cooler is supported by the transmission.

3. The automotive powertrain unit of claim 2, wherein
    the EGR cooler is a water-cooling cooler configured to circulate a coolant supplied from a water pump in the EGR cooler,
    the engine further comprising:
        a cooling circuit that includes:
            a first circuit configured to pass the coolant discharged from the water pump through a block water jacket formed in the cylinder block, then through a head water jacket formed in the cylinder head, and then sucked into the water pump; and
            a second circuit branching off from the block water jacket in the first circuit, wherein the EGR cooler is interposed in the second circuit.

4. The automotive powertrain unit of claim 1, wherein
    the engine includes:
        a camshaft provided at the cylinder head and extending along the engine output shaft; and
        a power transmission mechanism provided at the end of the engine along the engine output shaft, and configured to transmit power of the engine output shaft to the camshaft, wherein
    the cover covers the power transmission mechanism.

5. The automotive powertrain unit of claim 4, further comprising
    an accessory drive mechanism provided to a side on an other end of the engine opposite to the end of the engine coupled to the transmission along the engine output shaft, and configured to drive an accessory of the engine.

6. The automotive powertrain unit of claim 1, wherein
    the EGR is spaced apart from the second cover along the engine output shaft.

* * * * *